US012785488B2

(12) United States Patent
Suzuki

(10) Patent No.: US 12,785,488 B2
(45) Date of Patent: Nov. 3, 2026

(54) VEHICLE DRIVE DEVICE

(71) Applicant: AISIN CORPORATION, Kariya (JP)

(72) Inventor: Tomoyuki Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 219 days.

(21) Appl. No.: 18/699,763

(22) PCT Filed: Nov. 21, 2022

(86) PCT No.: PCT/JP2022/043030
§ 371 (c)(1),
(2) Date: Apr. 9, 2024

(87) PCT Pub. No.: WO2023/095753
PCT Pub. Date: Jun. 1, 2023

(65) Prior Publication Data

US 2024/0405634 A1 Dec. 5, 2024

(30) Foreign Application Priority Data

Nov. 25, 2021 (JP) ................................ 2021-190917

(51) Int. Cl.
*H02K 5/20* (2006.01)
*B60K 1/00* (2006.01)
(Continued)

(52) U.S. Cl.
CPC ............... *H02K 5/203* (2021.01); *B60K 1/00* (2013.01); *H02K 7/006* (2013.01); *H02K 7/116* (2013.01); *H02K 9/19* (2013.01); *B60K 2001/006* (2013.01)

(58) Field of Classification Search
CPC ............. H02K 5/20; H02K 5/203; H02K 9/19
See application file for complete search history.

(56) References Cited

U.S. PATENT DOCUMENTS

2005/0006963 A1* 1/2005 Takenaka ............... H02K 5/203 310/52
2015/0333602 A1* 11/2015 Mohr ..................... H02K 5/203 310/68 B
2022/0111740 A1 4/2022 Inoue

FOREIGN PATENT DOCUMENTS

JP 2020-089170 A 6/2020
WO WO-2020110887 A1 * 6/2020 ............. H02K 5/203
WO WO-2020202963 A1 * 10/2020 ........... F16H 57/037

OTHER PUBLICATIONS

18699763_2025-12-29_WO_2020110887_A1_H.pdf (Year: 2025).*
(Continued)

*Primary Examiner* — Christopher M Koehler
*Assistant Examiner* — Ahmed F Seck
(74) *Attorney, Agent, or Firm* — Oliff PLC

(57) ABSTRACT

A vehicle drive device is disclosed that includes a rotating electrical machine, a transmission mechanism, and an inverter device. The rotating electrical machine and a pair of output members have a two-axis configuration. The transmission mechanism includes, coaxially with the pair of output members, an output gear drivingly connected to at least one of the pair of output members. The inverter device is disposed so as to overlap a first output member that is one of the pair of output members as viewed in a direction along an up-down direction. A first coolant channel through which a coolant for cooling the rotating electrical machine passes and a second coolant channel through which a coolant for cooling the inverter device passes are provided in the case so as to communicate with each other.

8 Claims, 13 Drawing Sheets

(51) Int. Cl.
*H02K 7/00* (2006.01)
*H02K 7/116* (2006.01)
*H02K 9/19* (2006.01)

(56) References Cited

OTHER PUBLICATIONS

18699763_2025-12-29_WO_2020202963_A1_H.pdf (Year: 2025).*
Jan. 24, 2023 International Search Report issued in International Patent Application No. PCT/JP2022/043030.

* cited by examiner

VEHICLE DRIVE DEVICE

TECHNICAL FIELD

The present disclosure relates to vehicle drive devices.

BACKGROUND ART

A technique is known in which a coolant channel through which a coolant for cooling a rotating electrical machine passes and a coolant channel through which a coolant for cooling an inverter device passes form a common coolant channel in a case.

RELATED ART DOCUMENTS

Patent Documents

Patent Document 1: Japanese Unexamined Patent Application Publication No. 2020-89170 (JP 2020-89170 A)

SUMMARY OF THE DISCLOSURE

Problem to be Solved by the Invention

In a vehicle drive device having two or more axes, unlike a vehicle drive device with a single-axis configuration according to the above related art, it may be more advantageous to dispose an inverter device offset with respect to a rotating electrical machine in a horizontal direction intersecting an up-down direction in order to reduce the overall size in the up-down direction of the vehicle drive device. However, in the case where the inverter device is disposed offset with respect to the rotating electrical machine in the horizontal direction, it is not possible to use such a channel configuration as disclosed in Patent Document 1.

Therefore, in one aspect, it is an object of the present disclosure to implement an efficient channel configuration while reducing the overall size in an up-down direction of a vehicle drive device having two or more axes.

Means for Solving the Problem

According to one aspect of the present disclosure is provided.

Effects of the Invention

In one aspect, according to the present disclosure, an efficient channel configuration can be implemented while reducing the overall size in an up-down direction of a vehicle drive device having two or more axes.

MODES FOR CARRYING OUT THE DISCLOSURE

Figure 1:
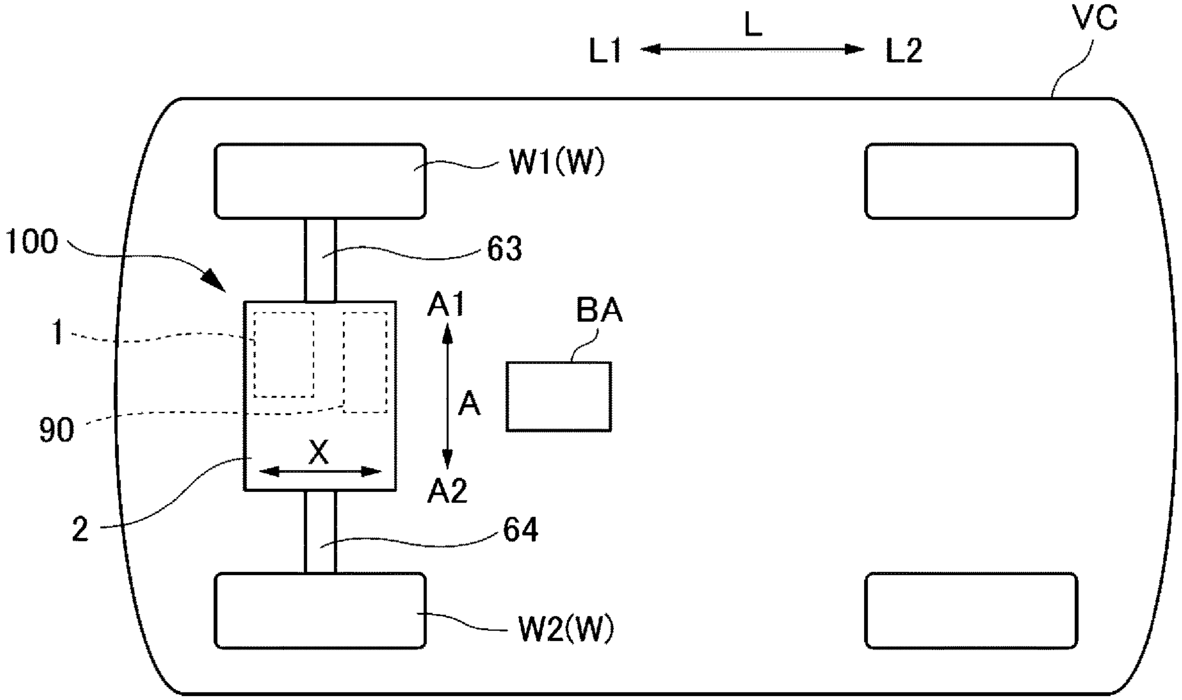
FIG. 1 is a schematic top view of a vehicle drive device mounted on a vehicle.

Embodiments will be described in detail below with reference to the accompanying drawings. The dimensional ratios in the drawings are merely illustrative, and are not limited to these. The shapes etc. in the drawings may be partially exaggerated for convenience of description.

In the following description, the vertical direction V (see FIG. 2 etc.) means the vertical direction when a vehicle drive device 100 is in use, that is, the vertical direction when the vehicle drive device 100 is disposed in an orientation in which it is supposed to be used. Since the vehicle drive device 100 is mounted on a vehicle VC (see FIG. 1) and used, the vertical direction V coincides with the vertical direction when the vehicle drive device 100 is mounted on the vehicle VC (hereinafter referred to as "vehicle-mounted state"), and more specifically, the vertical direction when the vehicle drive device 100 is in the vehicle-mounted state and the vehicle VC is stopped on a flat road (road along a horizontal plane). An upper side V1 and a lower side V2 mean the upper side and the lower side in the vertical direction V. The direction of each member in the following description represents the direction of the member mounted on the vehicle drive device 100. Terms related to the dimension of each member, the direction in which each member is disposed, and the position where each member is disposed, etc. represent concepts including a state in which there is a deviation due to a variation (variation to an extent that is allowable in manufacturing).

In the present application, "drivingly connected" refers to a state in which two rotating elements are connected such that a driving force (synonymous with torque) can be transmitted therebetween, and includes a state in which the two rotating elements are connected so as to rotate together or a state in which the two rotating elements are connected such that a driving force can be transmitted therebetween via one or more transmission members. Such transmission members include various members that transmit rotation at the same speed or at a shifted speed (e.g., a shaft, a gear mechanism, a belt, and a chain). The transmission members may include engagement devices that selectively transmit rotation and a driving force (e.g., a friction engagement device and an intermesh engagement device).

In the present specification, the "rotating electrical machine" is used as a concept including a motor (electric motor), a generator (power generator), and a motor generator that functions as both a motor and a generator as necessary. In the present specification, regarding arrangement of two members, the "two members overlap each other as viewed in a specific direction" means that, when an imaginary straight line parallel to the direction of the line of sight is moved in directions perpendicular to the imaginary straight line, there is an area where the imaginary straight line intersects both of the two members. In the present specification, regarding arrangement of two members, the "areas in a specific direction where the two members are disposed overlap each other" means that the area in the specific direction where one member is disposed includes at least part of the area in the specific direction where the other member is disposed.

Figure 2:
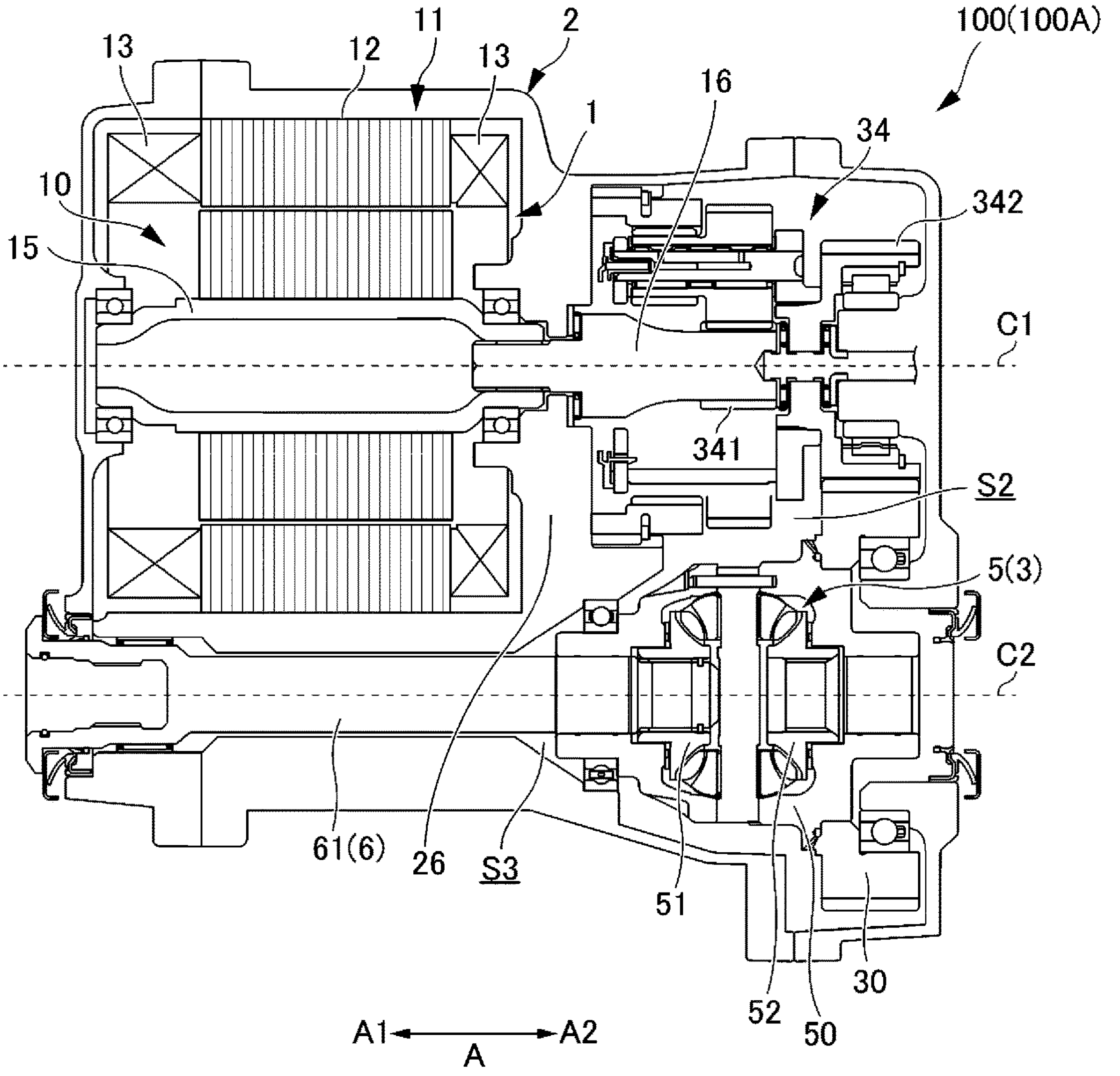
FIG. 2 is a sectional view of a main part of the vehicle drive device.
Figure 2A:
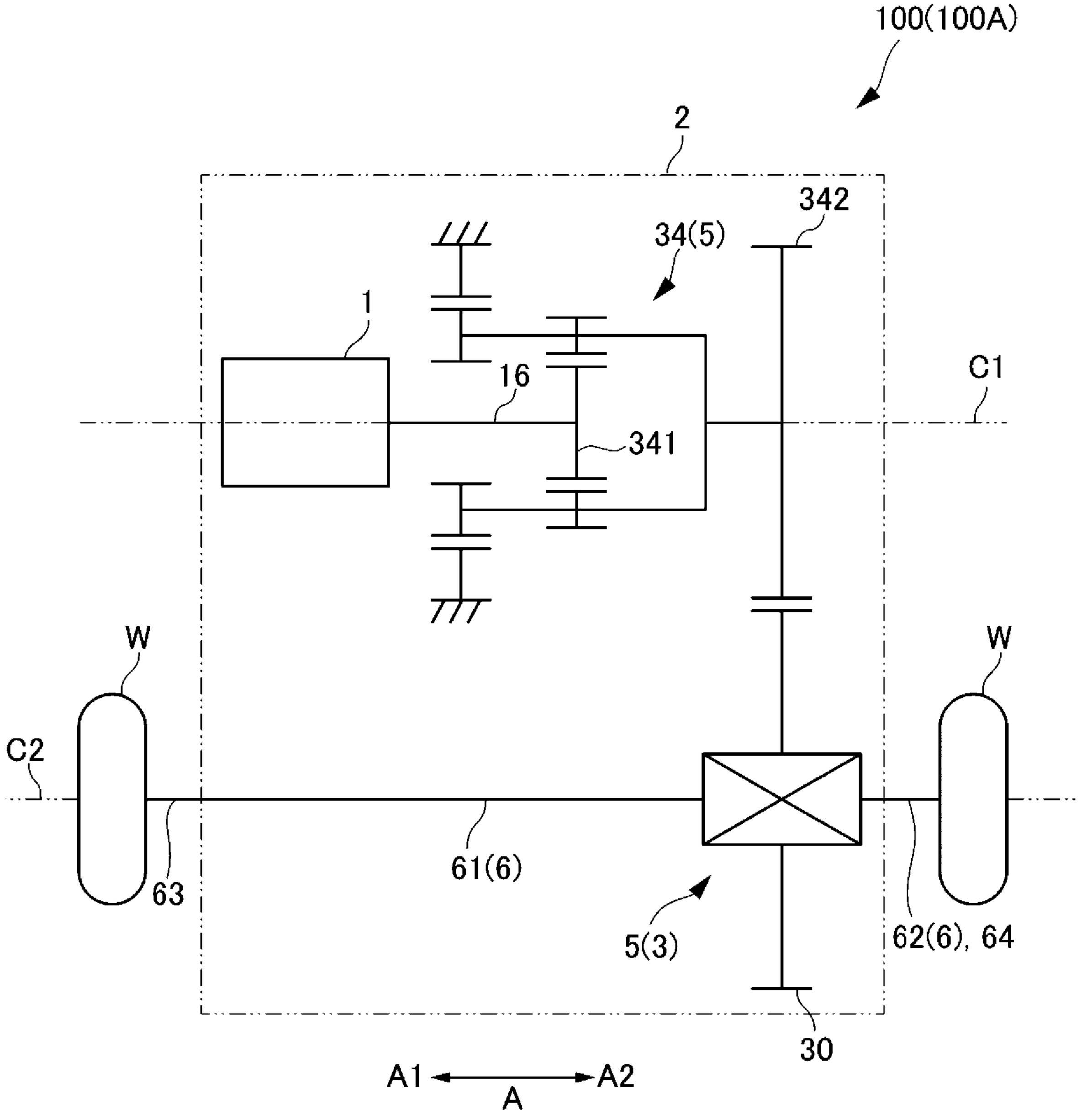
FIG. 2A is a skeleton diagram showing the vehicle drive device.
Figure 3:
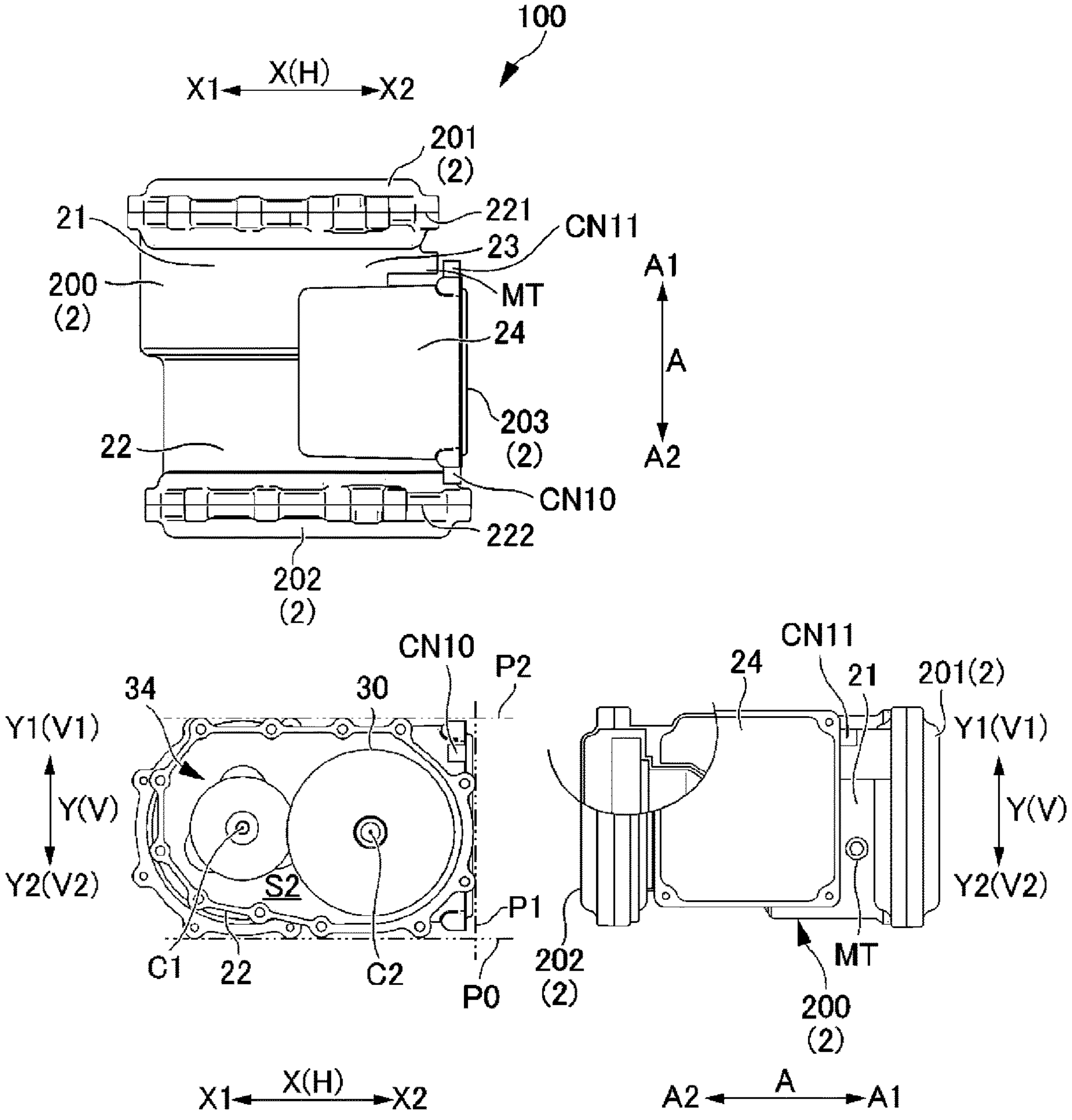
FIG. 3 is a three-view diagram schematically showing the vehicle drive device according to a first embodiment.

FIG. 1 is a schematic top view of the vehicle drive device 100 mounted on the vehicle VC. FIG. 2 is a sectional view of a main part of the vehicle drive device 100. FIG. 2A is a skeleton diagram showing the vehicle drive device 100. FIG. 3 is a three-view diagram schematically showing the vehicle drive device 100 according to an embodiment, in which the vehicle drive device 100 is shown partially transparent to show the inside.

As schematically shown in FIG. 1, the vehicle drive device 100 includes a rotating electrical machine 1, a pair of output members 6 drivingly connected to a pair of wheels W (see FIG. 1), a transmission mechanism 3 that transmits a driving force between the rotating electrical machine 1 and the pair of output members 6, and an inverter device 90 that controls drive of the rotating electrical machine 1. The vehicle drive device 100 further includes a case 2 that houses the rotating electrical machine 1 and the inverter device 90. The case 2 also houses the pair of output members 6 and the transmission mechanism 3.

A first output member 61 that is one of the pair of output members 6 is drivingly connected to a first wheel W1 that is one of the pair of wheels W, and a second output member 62 that is the other of the pair of output members 6 is drivingly connected to a second wheel W2 that is the other of the pair of wheels W. As shown in FIG. 1, the vehicle VC on which the vehicle drive device 100 is mounted includes a first drive shaft 63 that rotates with the first wheel W1, and a second drive shaft 64 that rotates with the second wheel W2. The first drive shaft 63 is connected to the first wheel W1 via, for example, a constant velocity joint, and the second drive shaft 64 is connected to the second wheel W2 via, for example, a constant velocity joint. The first output member 61 is connected to the first drive shaft 63 so as to rotate with the first drive shaft 63, and the second output member 62 is connected to the second drive shaft 64 so as to rotate with the second drive shaft 64.

The vehicle drive device 100 transmits the output torque of the rotating electrical machine 1 to the pair of wheels W via the pair of output members 6 to cause the vehicle VC with the vehicle drive device 100 to travel. That is, the rotating electrical machine 1 is a driving force source for the pair of wheels W. The pair of wheels W is a pair of right and left wheels (e.g., a pair of right and left front wheels or a pair of right and left rear wheels) in the vehicle VC. The rotating electrical machine 1 may be, for example, an alternating-current rotating electrical machine that is driven by a three-phase alternating current (example of a multiphase alternating current). The rotating electrical machine 1 is electrically connected to a battery BA (including an energy storage device such as a capacitor) via the inverter device 90 that performs power conversion between direct current power and alternating current power, and is supplied with electric power from the battery BA to perform power running, or supplies electric power generated by the inertial force of the vehicle VC etc. to the energy storage device to store the electric power in the energy storage device.

As shown in FIG. 2, the rotating electrical machine 1 and the pair of output members 6 are disposed separately along two axes that are parallel to each other (specifically, a first axis C1 and a second axis C2). Specifically, the rotating electrical machine 1 is disposed on the first axis C1, and the pair of output members 6 is disposed on the second axis C2 different from the first axis C1. The first axis C1 and the second axis C2 are axes (imaginary axes) arranged parallel to each other. The transmission mechanism 3 includes, coaxially with the pair of output members 6 (i.e., on the second axis C2), an output gear 30 drivingly connected to at least one of the pair of output members 6.

As shown in FIG. 1, the vehicle drive device 100 is mounted on the vehicle VC in such an orientation that an axial direction A extends along the right-left direction of the vehicle. The axial direction A is a direction parallel to the first axis C1 and the second axis C2, in other words, a common axial direction of the first axis C1 and the second axis C2. That is, the axial direction A is a direction in which the rotation axis of the rotating electrical machine 1 extends, and is also a direction in which the rotation axis of the pair of output members 6 extends. One side in the axial direction A will be referred to as first side A1 in the axial direction, and the other side in the axial direction A (opposite side in the axial direction A from the first side A1 in the axial direction) will be referred to as second side A2 in the axial direction. The first side A1 in the axial direction is the side on which the rotating electrical machine 1 is disposed with respect to the transmission mechanism 3 in the axial direction A. As shown in FIG. 2, the first output member 61 is the output member 6 disposed on the first side A1 in the axial direction out of the pair of output members 6, and the second output member 62 is the output member 6 disposed on the second side A2 in the axial direction out of the pair of output members 6.

As shown in FIG. 1, the vehicle drive device 100 may be mounted on the vehicle VC in such an orientation that the first side A1 in the axial direction is the right side of the vehicle and the second side A2 in the axial direction is the left side of the vehicle. In this case, the first wheel W1 to which the first output member 61 is drivingly connected is a right wheel, and the second wheel W2 to which the second output member 62 is drivingly connected is a left wheel. In FIG. 1, it is assumed that the vehicle drive device 100 is a front wheel drive type drive device that drives a pair of right and left front wheels. Therefore, in the example shown in FIG. 1, the first wheel W1 is the right front wheel, and the second wheel W2 is the left front wheel.

As shown in FIG. 2, the rotating electrical machine 1 includes a rotor 10 and a stator 11. The stator 11 is fixed to the case 2, and the rotor 10 is supported by the case 2 so as to be rotatable relative to the stator 11. The rotating electrical machine 1 may be an inner rotor type rotating electrical machine. In this case, the rotor 10 may be disposed radially inside the stator 11 so as to overlap the stator 11 as viewed in a radial direction along a radial direction. As used herein, the radial direction is a radial direction with respect to the first axis C1, in other words, a radial direction with respect to the rotation axis of the rotating electrical machine 1.

The stator 11 includes a stator core 12 and coil end portions 13 protruding in the axial direction A from the stator core 12. A coil is wound around the stator core 12, and portions of the coil that protrude in the axial direction A from the stator core 12 form the coil end portions 13. The coil end portions 13 are formed on both sides in the axial direction A of the stator core 12.

The transmission mechanism 3 includes a speed reduction mechanism 34 in a power transmission path between the rotating electrical machine 1 and the output gear 30. The speed reduction mechanism 34 may be of any type, and may include a speed reduction mechanism using a counter gear, a speed reduction mechanism using a planetary gear, etc. In the present embodiment, as an example, the speed reduction mechanism 34 includes a planetary gear mechanism, and the speed reduction mechanism 34 is disposed coaxially with the rotating electrical machine 1. An output gear (carrier) 342 of the speed reduction mechanism 34 meshes with the output gear 30 of the differential gear mechanism 5 in the radial direction. Such a vehicle drive device 100 can have a compact configuration with two axes (first axis C1 and second axis C2). In a modification, the vehicle drive device 100 may have three or more axes.

In the present embodiment, the speed reduction mechanism 34 is disposed coaxially with the rotating electrical machine 1 (that is, on the first axis C1) so as to be drivingly connected to the rotating electrical machine 1. An input member 16 that meshes with a sun gear 341 of the speed reduction mechanism 34 is connected to the rotor 10 so as to rotate with the rotor 10. In the example shown in FIG. 2, the vehicle drive device 100 includes a rotor shaft 15 to which the rotor 10 is fixed, and the input member 16 is connected to the rotor shaft 15 so as to rotate with the rotor shaft 15. Specifically, a portion on the first side A1 in the axial direction of the input member 16 may be connected (in this example, spline-connected) to a portion on the second side A2 in the axial direction of the rotor shaft 15. Unlike such a configuration, the rotor shaft 15 and the input member 16 of the vehicle drive device 100 may be formed integrally as a single-piece member.

The transmission mechanism 3 further includes a differential gear mechanism 5. The differential gear mechanism 5 distributes the driving force transmitted from the rotating electrical machine 1 side to the pair of output members 6. The differential gear mechanism 5 may be disposed coaxially with the pair of output members 6 (that is, on the second axis C2). The differential gear mechanism 5 distributes the driving force transmitted from the rotating electrical machine 1 side to the output gear 30 to the pair of output members 6. That is, the output gear 30 is drivingly connected to both of the pair of output members 6 via the differential gear mechanism 5. The differential gear mechanism 5 may be a bevel gear type differential gear mechanism, and the output gear 30 may be connected to a differential case portion 50 of the differential gear mechanism 5 so as to rotate with the differential case portion 50.

In the example shown in FIG. 2, the differential gear mechanism 5 distributes rotation of the output gear 30 to a first side gear 51 and a second side gear 52. The first side gear 51 rotates with the first output member 61, and the second side gear 52 rotates with the second output member 62. The first side gear 51 may be formed as a separate member from a member constituting the first output member 61 (in this example, a shaft member), and may be connected (in this example, spline-connected) to the first output member 61 so as to rotate with the first output member 61. At least a portion on the first side A1 in the axial direction of the first output member 61 may have a tubular shape (specifically, a cylindrical shape) extending in the axial direction A, and the first drive shaft 63 (see FIG. 1) may be inserted from the first side A1 in the axial direction into the first output member 61 (space surrounded by an inner peripheral surface). The second output member 62 may be connected to the second side gear 52. The second output member 62 may be implemented by the second drive shaft 64.

In the present embodiment, the output gear 30 of the differential gear mechanism 5 is preferably disposed near an end on the second side A2 in the axial direction of the case 2. In this case, a gear (not shown) of the speed reduction mechanism 34 that meshes with the output gear 30 may be disposed furthest to the second side A2 in the axial direction of the speed reduction mechanism 34. In this case, the output gear 30 can be disposed closer to the second side A2 in the axial direction of the entire vehicle drive device 100.

In the present embodiment, the case 2 includes, in an integrated form, a motor case portion 21, a transmission mechanism case portion 22, an output shaft case portion 23, and an inverter case portion 24. As used herein, the "integrated form" includes an integrated form using a fastening member such as a bolt, and an integrated form using integral molding (e.g., casting or casting using aluminizing etc.).

The motor case portion 21 forms a motor housing chamber S1 that houses the rotating electrical machine 1, the transmission mechanism case portion 22 forms a transmission mechanism housing chamber S2 that houses the transmission mechanism 3, the output shaft case portion 23 forms a output shaft housing chamber S3 that houses the first output member 61, and the inverter case portion 24 forms an inverter housing chamber S4 that houses the inverter device 90. The "motor case portion 21 forms the motor housing chamber S1" means that a wall portion that defines the motor housing chamber S1 forms the motor case portion 21. The same applies to the transmission mechanism housing chamber S2, the output shaft case portion 23, and the inverter case portion 24.

In the present embodiment, since there is the output shaft case portion 23, the first output member 61 can be more effectively protected from the external environment (e.g., flying stones etc.) compared to the case where the first output member 61 is provided outside the case 2. Moreover, the clearance that should be secured between the first output member 61 and peripheral components can be reduced.

The case 2 may be formed by joining a plurality of members (case member and cover member). Therefore, one case member that forms the case 2 may form two or more of the following case portions: the motor case portion 21, the transmission mechanism case portion 22, the output shaft case portion 23, and the inverter case portion 24.

The motor housing chamber S1, the transmission mechanism housing chamber S2, the output shaft housing chamber S3, and the inverter housing chamber S4 that are formed by the case 2 may be completely separated from each other, may partially communicate with each other, or may form a common housing chamber with no boundaries therebetween. For example, the motor housing chamber S1 and the output shaft housing chamber S3 may form a common housing chamber with no partition wall separating them from each other. In this case, the rotating electrical machine 1 and the first output member 61 are housed in a common housing chamber (specifically, the motor housing chamber S1 and the output shaft housing chamber S3) formed by the case 2.

In the following description, as an example, it is assumed that the case 2 is formed by joining a case member 200, a motor cover member 201, a differential cover member 202, and an inverter cover member 203. The joining method may be fastening with bolts etc.

The case member 200 may be formed as a single-piece member (e.g., a single member formed by die casting and made of the same material). In this case, the motor housing chamber S1 and the transmission mechanism housing chamber S2 may be separated by a single partition wall 26.

The case member 200 is open in the axial direction A on the first side A1 in the axial direction and is open in the axial direction A on the second side A2 in the axial direction.

The motor cover member 201 is provided so as to cover the opening on the first side A1 in the axial direction of the case member 200 (that is, the opening on the first side A1 in the axial direction of the motor housing chamber S1). The motor cover member 201 may be formed as a single-piece member. The motor cover member 201 may be joined to an end face (joint surface) on the first side A1 in the axial direction of the case member 200. In this case, a joint surface (mating surface) 221 between the motor cover member 201 and the case member 200 may extend in a plane perpendicular to the axial direction A.

The differential cover member 202 is provided so as to cover the opening on the second side A2 in the axial direction of the case member 200 (that is, the opening on the second side A2 in the axial direction of the transmission mechanism housing chamber S2). The differential cover member 202 may be formed as a single-piece member. The differential cover member 202 may be joined to an end face (joint surface) on the second side A2 in the axial direction of the case member 200. In this case, a joint surface (mating surface) 222 between the differential cover member 202 and the case member 200 may extend in a plane perpendicular to the axial direction A.

The inverter cover member 203 is provided so as to cover an opening of the inverter housing chamber S4 of the case member 200. The inverter cover member 203 may be formed as a single-piece member.

The inverter device 90 may be in the form of a module, and may be fixed to a wall portion forming the inverter case portion 24 with bolts etc. The inverter device 90 includes: a power module PM (described later) including a plurality of switching elements constituting an inverter circuit; a control board SB (described later) on which a control device for controlling the inverter circuit is mounted; and a smoothing capacitor CM (described later) that smooths a voltage between positive and negative electrodes on the direct current side of the inverter circuit. The inverter device 90 may further include various sensors such as a current sensor, a filter (not shown) such as a Y capacitor, various wires (including connectors and bus bars), etc. The inverter device 90 may include a coolant channel (described later) for cooling the power module PM. The smoothing capacitor CM may be in the form of a module in which a plurality of capacitor elements and terminals are molded with resin.

As shown in FIG. 3, a direction in which the rotating electrical machine 1 and the inverter device 90 are arranged as viewed in an axial direction along the axial direction A is defined as a first direction X, and a direction perpendicular to both the axial direction A and the first direction X is defined as a second direction Y. One side in the first direction X will be referred to as first side X1 in the first direction, and the other side in the first direction X (opposite side in the first direction X from the first side X1 in the first direction) will be referred to as second side X2 in the first direction. One side in the second direction Y will be referred to as first side Y1 in the second direction, and the other side in the second direction Y (opposite side in the second direction Y from the first side Y1 in the second direction) will be referred to as second side Y2 in the second direction. The first side X1 in the first direction is the side on which the rotating electrical machine 1 is disposed with respect to the inverter device 90 in the first direction X.

In the following description, it is assumed that the second direction has a component in the up-down direction. In this case, the second direction may be parallel to or tilted with respect to the direction of gravity (vertical direction) when the vehicle drive device 100 is mounted on the vehicle VC. For example, the vehicle drive device 100 may be mounted on the vehicle VC in such an orientation that the first side Y1 in the second direction is the upper side V1 and the second side Y2 in the second direction is the lower side V2. The vehicle drive device 100 may be mounted on the vehicle VC in such an orientation that the first side X1 in the first direction is a front side L1 (front side in a vehicle front-rear direction L) and the second side X2 in the first direction is a rear side L2 (rear side in the vehicle front-rear direction L). As shown in FIG. 1, the vehicle drive device 100 may be mounted on the front side L1 with respect to a middle portion in the vehicle front-rear direction L of the vehicle VC. In the case where the vehicle drive device 100 is mounted on the rear side L2 with respect to the middle portion in the vehicle front-rear direction L of the vehicle VC, the vehicle drive device 100 is mounted on the vehicle VC in such an orientation that the first side X1 in the first direction is the rear side L2 and the second side X2 in the first direction is the front side L1. The inverter device 90 can thus be disposed closer to the middle in the vehicle front-rear direction L than the rotating electrical machine 1. In the case where the vehicle drive device 100 is mounted on the rear side L2 with respect to the middle portion in the vehicle front-rear direction L of the vehicle VC as described above, the pair of wheels W to be driven by the vehicle drive device 100 may be, for example, the pair of right and left rear wheels.

In the case where the vehicle VC includes the pair of right and left front wheels and the pair of right and left rear wheels, the pair of right and left front wheels or the pair of right and left rear wheels, whichever is not driven by the vehicle drive device 100 (in the example shown in FIG. 1, the pair of right and left rear wheels), may be driven by a drive device other than the vehicle drive device 100. The drive device other than the vehicle drive device 100 is, for example, a drive device configured to transmit the output torque of an internal combustion engine (example of a driving force source other than a rotating electrical machine) to the pair of wheels to be driven by the drive device, a drive device configured to transmit the output torque of a rotating electrical machine (rotating electrical machine different from the rotating electrical machine 1 of the vehicle drive device 100) to the pair of wheels to be driven by the drive device, or a drive device configured to transmit the output torques of both the internal combustion engine and the rotating electrical machine (rotating electrical machine different from the rotating electrical machine 1 of the vehicle drive device 100) to the pair of wheels to be driven by the drive device. The drive device other than the vehicle drive device 100 may be a drive device having the same configuration as the vehicle drive device 100.

Of the vehicle drive device 100, the rotating electrical machine 1 may have the largest size in the second direction as viewed in the axial direction. The size of the rotating electrical machine 1 is determined by required output etc. Therefore, in order to reduce the overall size in the second direction of the vehicle drive device 100, it is useful to arrange main components of the vehicle drive device 100 (main components other than the rotating electrical machine 1) so that they overlap the rotating electrical machine 1 as viewed in the first direction X. Particularly, in the case where the vehicle drive device 100 includes the output gear 30 with a relatively large outer diameter, the positional relationship between the output gear 30 and the rotating electrical machine 1 may significantly affect the overall size in the second direction of the vehicle drive device 100.

In view of this point, in the present embodiment, the output gear 30 is preferably disposed with respect to the rotating electrical machine 1 so as not to significantly affect the overall size in the second direction of the vehicle drive device 100. That is, the amount of offset in the second direction Y between the central axis of the output gear 30 (i.e., the second axis C2) and the central axis of the rotating electrical machine 1 (i.e., the first axis C1) is set relatively small. Specifically, the pair of output members 6 concentric with the central axis of the output gear 30 is disposed so as to overlap the rotor shaft 15 of the vehicle drive device 100 as viewed in the first direction. In this case, the positional relationship between the output gear 30 and the rotating electrical machine 1 may be set so that the outer shape of the output member 6 (e.g., a circular outer shape portion) overlaps the outer shape of the rotor shaft 15 (e.g., a circular outer shape portion) as viewed in the first direction. Alternatively, the positional relationship therebetween may be set so that the central axis of the output members 6 (i.e., the second axis C2) overlaps the rotor shaft 15 as viewed in the first direction, or the positional relationship therebetween may be set so that the central axis of the rotor shaft 15 (i.e., the first axis C1) overlaps the pair of output members 6 as viewed in the first direction. Arranging the output gear 30 and the rotating electrical machine 1 in such a positional relationship can reduce or eliminate the influence of the output gear 30 on the overall size in the second direction of the vehicle drive device 100. That is, since the overall size in the second direction of the vehicle drive device 100 is substantially determined by the size of the rotating electrical machine 1 (and therefore the size of the motor case portion 21), the overall size in the second direction of the vehicle drive device 100 can be minimized under the condition of the same size of the rotating electrical machine 1.

Next, a characteristic configuration regarding the placement of the inverter device 90 according to the present embodiment will be described with further reference to FIG. 4 and the subsequent figures.

Figure 4:
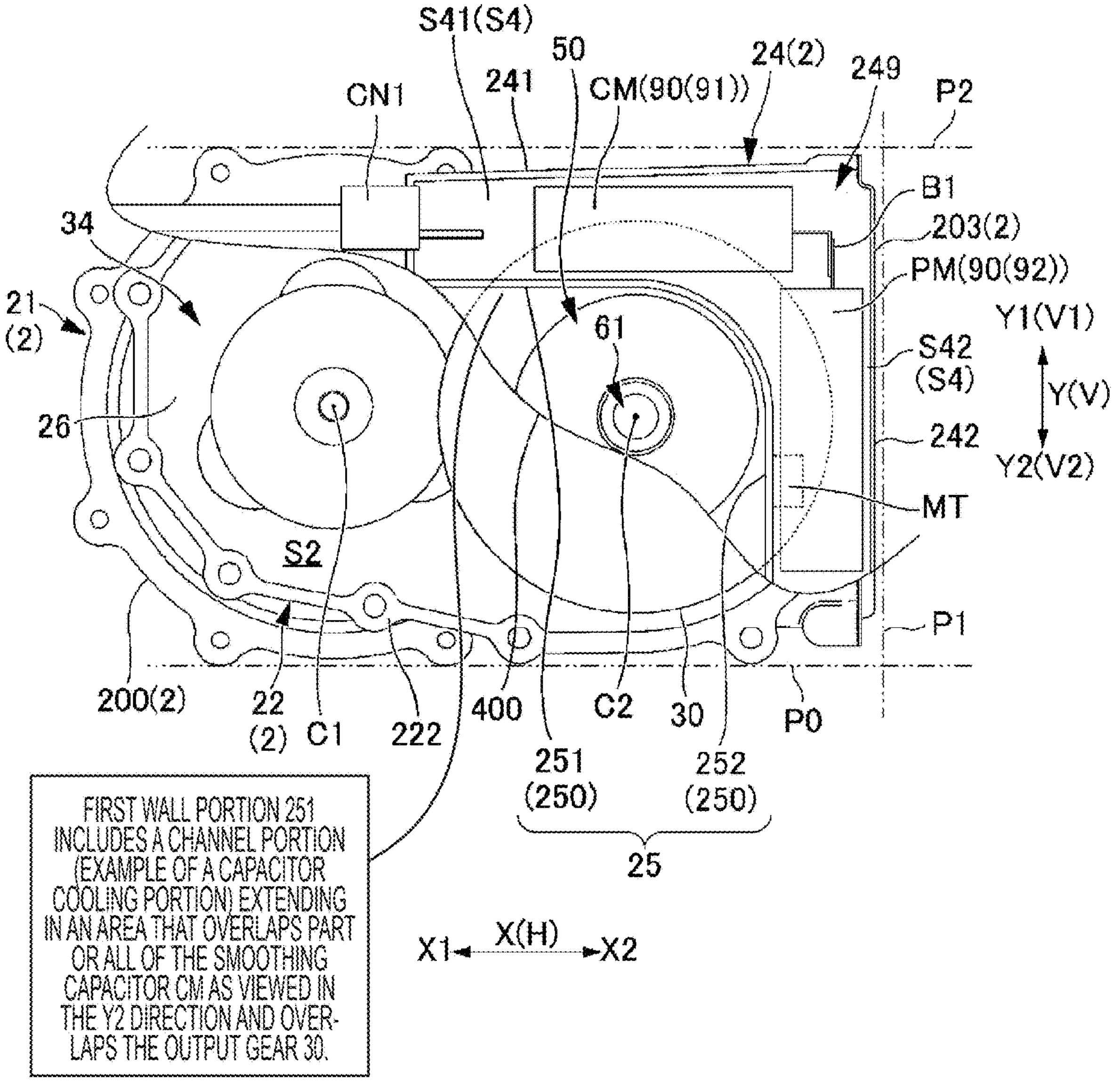
FIG. 4 is a diagram schematically showing the vehicle drive device according to the first embodiment as viewed in an axial direction.
Figure 5:
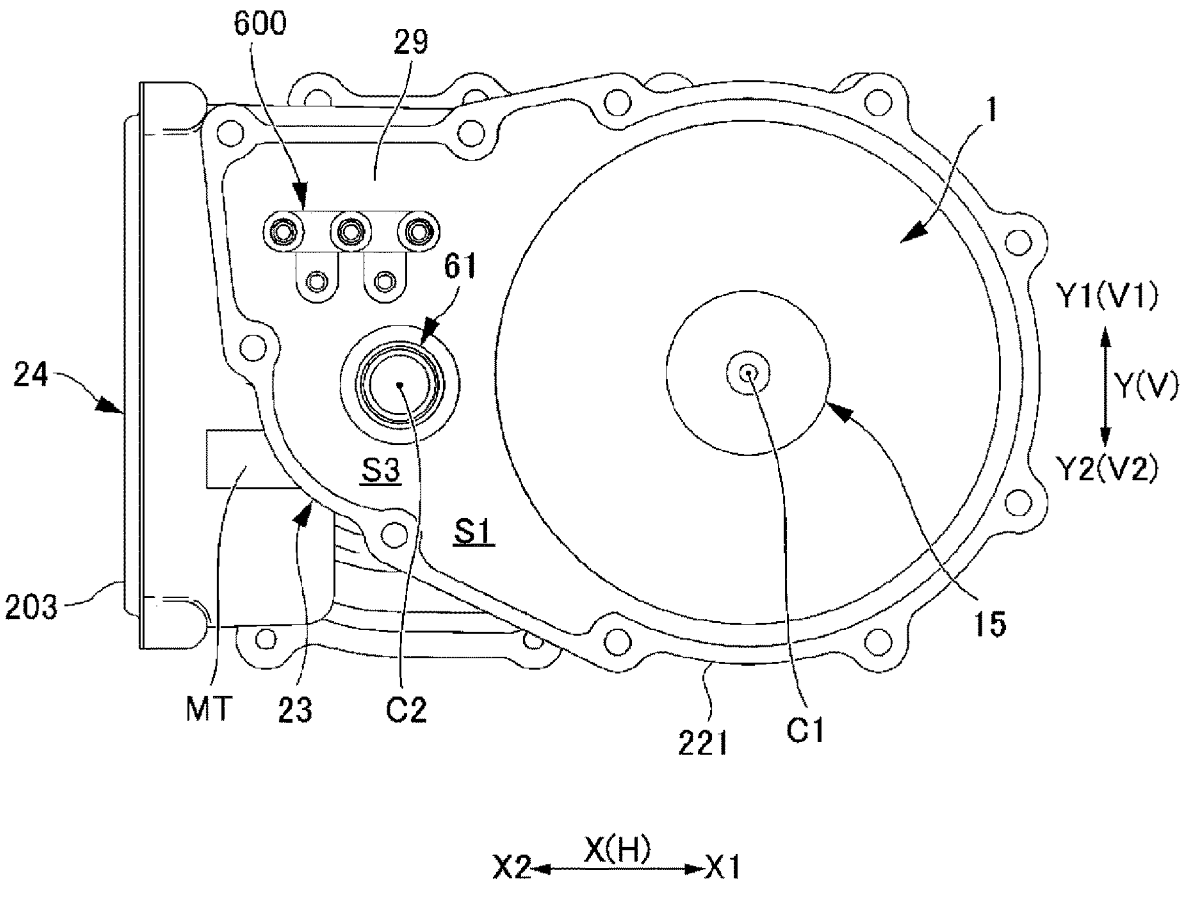
FIG. 5 is a diagram schematically showing the vehicle drive device according to the first embodiment as viewed in the axial direction from a first side in the axial direction.
Figure 6:
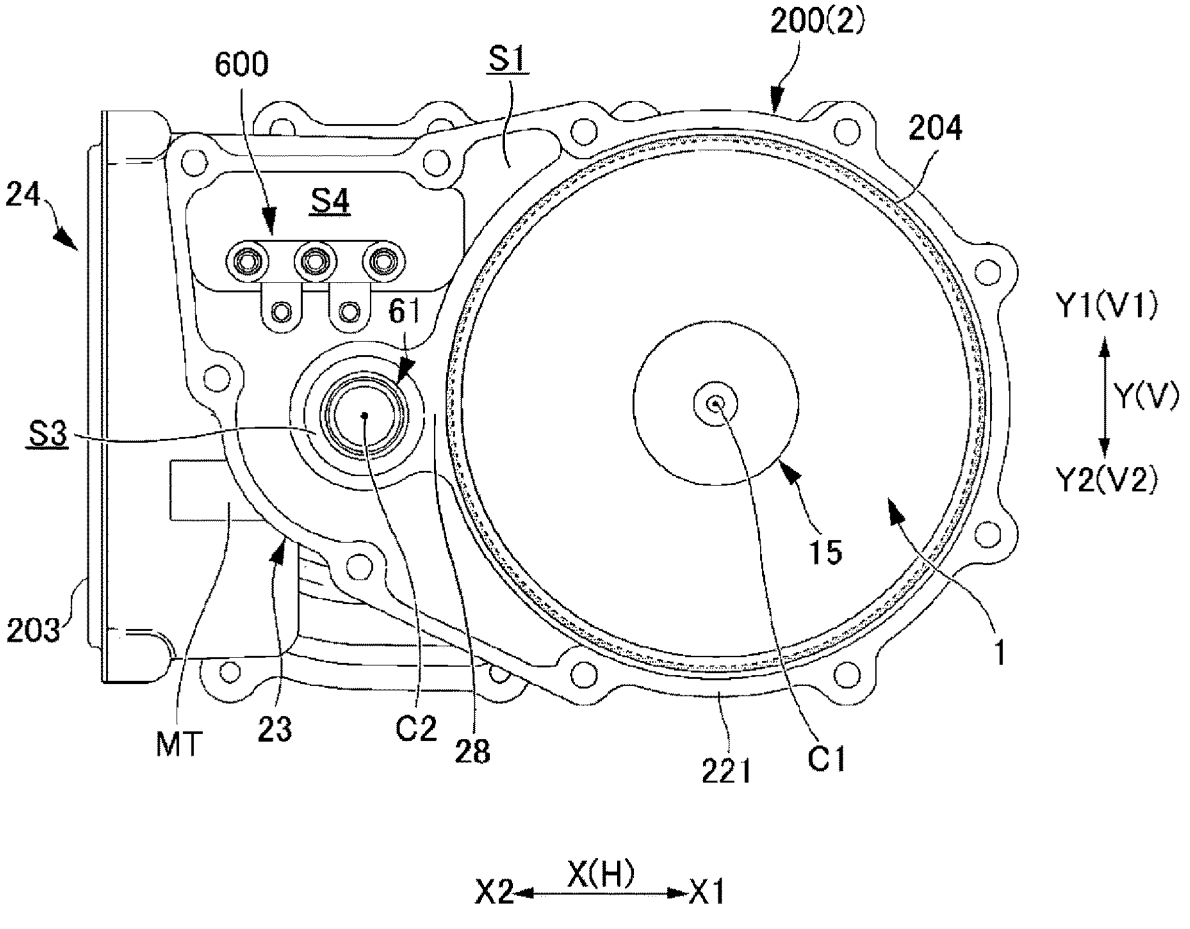
FIG. 6 is an illustration of a modification made to FIG. 5.

FIG. 4 is a diagram schematically showing the vehicle drive device 100 as viewed in the axial direction, in which the areas on both sides of a line 400 are the areas offset from each other in the axial direction A to show different portions. FIG. 5 is a diagram schematically showing the vehicle drive device 100 as viewed in the axial direction from the first side A1 in the axial direction, in which the vehicle drive device 100 is shown partially transparent to show the inside. FIG. 6 is an illustration of a modification made to FIG. 5.

In the present embodiment, the inverter case portion 24 has an L-shape as viewed in the axial direction, and includes an upper case portion 241 and a side case portion 242. The upper case portion 241 and the side case portion 242 form housing spaces that communicate with each other.

Specifically, the upper case portion 241 extends in the first direction X and the axial direction A, and forms a first inverter housing chamber S41 inside. The side case portion 242 extends in the second direction Y and the axial direction A, and forms a second inverter housing chamber S42 inside. In this case, the inverter case portion 24 extends around the differential case portion 50 and the first output member 61 in the axial direction A (so as to face the differential case portion 50 and the first output member 61 in the first direction X and the second direction Y). That is, the inverter case portion 24 forms a peripheral wall portion 250 that extends so as to surround the differential case portion 50 and the first output member 61 in the output shaft case portion 23 (peripheral wall portion along part of the entire circumference around the second axis C2). The peripheral wall portion 250 extends in such a manner that it separates the inverter housing chamber S4 from the output shaft housing chamber S3. In this case, the peripheral wall portion 250 includes a first wall portion 251 extending in the first direction X and the axial direction A, and a second wall portion 252 extending in the second direction Y and the axial direction A. The first wall portion 251 and the second wall portion 252 overlap the output gear 30 as viewed in the axial direction. The inverter housing chamber S4 can thus be separated from the output shaft housing chamber S3 without increasing the overall sizes in the first direction X and the second direction Y of the vehicle drive device 100 due to the peripheral wall portion 250.

The first inverter housing chamber S41 and the second inverter housing chamber S42 may communicate with each other, and may be perpendicular at a corner on the second side X2 in the first direction and the first side Y1 in the second direction. In this case, the inverter case portion 24 has a corner portion 249 (see FIG. 4) on the second side X2 in the first direction and the first side Y1 in the second direction.

The range in which the first inverter housing chamber S41 extends in the axial direction A and the range in which the second inverter housing chamber S42 extends in the axial direction A overlap each other. For example, the range in which the first inverter housing chamber S41 extends in the axial direction A and the range in which the second inverter housing chamber S42 extends in the axial direction A may be substantially the same. Alternatively, one of the range in which the first inverter housing chamber S41 extends in the axial direction A and the range in which the second inverter housing chamber S42 extends in the axial direction A may be set shorter than the other.

The inverter case portion 24 is preferably formed so as not to affect the overall size in the second direction Y of the case 2 in order to prevent an increase in overall size of the case 2. In the present embodiment, the overall size in the second direction Y of the case 2 is determined by the size in the second direction Y of the rotating electrical machine 1 (see lines P0 and P2 in FIGS. 3 and 4), and specifically, is determined by the size in the second direction Y of the motor case portion 21. Therefore, the inverter case portion 24 is disposed on the second side Y2 in the second direction with respect to the position furthest to the first side Y1 in the second direction of the motor case portion 21 (see line P2 in FIGS. 3 and 4). In this case, the overall size in the second direction Y of the case 2 can be reduced.

The upper case portion 241 of the inverter case portion 24 is preferably disposed between both end faces of the case member 200 in the axial direction A. That is, the inverter case portion 24 is preferably disposed between the joint surface (mating surface) 221 between the motor cover member 201 and the case member 200 and the joint surface (mating surface) 222 between the differential cover member 202 and the case member 200 in the axial direction A. In this case, it is easier to dispose the inverter case portion 24 on the second side Y2 in the second direction with respect to the position furthest to the first side Y1 in the second direction of the differential cover member 202, compared to the case where the inverter case portion 24 is formed so as to protrude beyond both end faces of the case member 200 in the axial direction A. That is, since the second side Y2 in the second direction of the inverter case portion 24 can be located on the second side Y2 in the second direction with respect to flanges of the mating surfaces 221, 222, the inverter case portion 24 can be easily disposed on the second side Y2 in the second direction with respect to the position furthest to the first side Y1 in the second direction of the differential cover member 202.

The inverter case portion 24 is preferably formed so as not to affect the overall size in the first direction X of the case 2 in order to prevent an increase in overall size of the case 2. In the present embodiment, the boundary (outer shape) on the second side X2 in the first direction of the overall size in the first direction X of the case 2 is determined by the size of the differential gear mechanism 5, and specifically, is determined by the size in the first direction X of the transmission mechanism case portion 22. Therefore, the inverter case portion 24 is disposed on the first side X1 in the first direction with respect to (side closer to the rotating electrical machine 1 than) the position furthest to the second side X2 in the first direction of the transmission mechanism case portion 22 (end position on the second side X2 in the first direction, see line P1 in FIGS. 3 and 4). In this case, the overall size in the first direction X of the case 2 can be reduced.

In the present embodiment, the inverter housing chamber S4 may be open in the first direction X on the second side X2 in the first direction. In this case, the inverter cover member 203 may extend in the axial direction A and the second direction Y. In this case, the inverter cover member 203 may extend on the first side X1 in the first direction (side closer to the rotating electrical machine 1) with respect to the position furthest to the second side X2 in the first direction of the transmission mechanism case portion 22.

Although each of the first inverter housing chamber S41 and the second inverter housing chamber S42 may have any capacity, the capacities of the first inverter housing chamber S41 and the second inverter housing chamber S42 may be determined according to components of the inverter device 90 that are housed therein. In the present embodiment, as an example, the size of the rotating electrical machine 1 is larger than the size of the output gear 30 as viewed in the axial direction. Therefore, around the second axis C2, a dead space is more likely to be formed on the first side Y1 in the second direction than on the second side X2 in the first direction (space on the first side X1 in the first direction with respect to the position furthest to the second side X2 in the first direction of the transmission mechanism case portion 22 and on the second side Y2 in the second direction with respect to the position furthest to the first side Y1 in the second direction of the motor case portion 21). Therefore, the dimension (e.g., maximum dimension or average dimension) in the second direction Y of the first inverter housing chamber S41 may be preferably set larger than the dimension in the first direction X of the second inverter housing chamber S42. In this case, the inverter case portion 24 can be easily disposed on the second side Y2 in the second direction with respect to the position furthest to the first side Y1 in the second direction of the motor case portion 21 and on the first side X1 in the first direction (side closer to the rotating electrical machine 1) with respect to the position furthest to the second side X2 in the first direction of the transmission mechanism case portion 22.

Hereinafter, of the components of the inverter device 90, the components disposed in the upper case portion 241 will be referred to as first inverter unit 91, and the components disposed in the side case portion 242 will be referred to as second inverter unit 92. The first inverter unit 91 may preferably include the smoothing capacitor CM, and the second inverter unit 92 may preferably include the power module PM. Such an arrangement is suitable when the thickness (height) of a required mounting space is greater for the smoothing capacitor CM than for the power module PM.

As shown in FIG. 4, in the present embodiment, the rotating electrical machine 1 and the first inverter unit 91 of the inverter device 90 or the upper case portion 241 are arranged so that the areas in the vertical direction V where the rotating electrical machine 1 and the first inverter unit 91 of the inverter device 90 or the upper case portion 241 are disposed overlap each other. Therefore, as an example, a horizontal direction H perpendicular to the axial direction A (in other words, a direction perpendicular to the axial direction A and the vertical direction V) can be defined as the first direction X. In this case, as shown in FIG. 4, the second direction Y is parallel to the vertical direction V. As another example, a direction along an imaginary straight line passing through the first axis C1 and the center of the first inverter unit 91 or upper case portion 241 as viewed in the axial direction can also be defined as the first direction X. The "center of the first inverter unit 91 or upper case portion 241 as viewed in the axial direction" can be herein the center of gravity of a figure defining the outer shape (outer edge) of the first inverter unit 91 or upper case portion 241 as viewed in the axial direction. In the example shown in FIG. 4, the horizontal direction H perpendicular to the axial direction A and the direction along the imaginary straight line as viewed in the axial direction are parallel to each other. That is, in the example shown in FIG. 4, the first direction X is defined as the same direction by either of the above two definitions.

As shown in FIG. 4, the first output member 61 is interposed between the rotating electrical machine 1 and the inverter device 90 in the first direction X at a position in the second direction Y where both the rotating electrical machine 1 and the inverter device 90 (or the second inverter unit 92 of the inverter device 90 or the side case portion 242) are disposed. The portion of the first output member 61 that is interposed between the rotating electrical machine 1 and the inverter device 90 in the first direction X is disposed so that the areas in the axial direction A where this portion of the first output member 61 and the rotating electrical machine 1 are disposed overlap each other and the areas in the axial direction A where this portion of the first output member 61 and the inverter device 90 are disposed overlap each other (see FIG. 3). As shown in FIG. 4, the output gear 30 may be disposed so as to overlap the rotating electrical machine 1 and the inverter device 90 as viewed in the axial direction. Specifically, the output gear 30 may be disposed so that a portion on the first side X1 in the first direction of the output gear 30 overlaps the rotating electrical machine 1 as viewed in the axial direction and a portion on the second side X2 in the first direction of the output gear 30 overlaps the inverter device 90 as viewed in the axial direction. As shown in FIG. 3, the output gear 30 is disposed on one side in the axial direction A (specifically, the second side A2 in the axial direction) with respect to the rotating electrical machine 1 and the inverter device 90.

In the present embodiment, the rotating electrical machine 1 and the inverter device 90 may be disposed in such a manner that the areas in the axial direction A where the rotating electrical machine 1 and the inverter device 90 are disposed do not overlap each other. That is, the inverter device 90 or the inverter case portion 24 may be disposed on the second side X2 in the first direction with respect to the rotating electrical machine 1. However, the areas in the axial direction A where a portion on the first side A1 in the axial direction of the inverter device 90 or inverter case portion 24 and a portion on the second side A2 in the axial direction of the rotating electrical machine 1 are disposed may overlap each other. The same applies to the first direction X. Specifically, the inverter device 90 or the inverter case portion 24 may be disposed on the second side X2 in the first direction with respect to the rotating electrical machine 1. That is, the inverter device 90 or the inverter case portion 24 may be disposed in an area that overlaps a portion of the transmission mechanism 3 located around the second axis C2 (transmission mechanism 3 other than the speed reduction mechanism 34) as viewed in the second direction. However, the areas in the first direction X where a portion on the first side X1 in the first direction of the inverter device 90 or inverter case portion 24 and a portion on the second side X2 in the first direction of the rotating electrical machine 1 or speed reduction mechanism 34 are disposed may overlap each other.

In the present embodiment, at least part of the side case portion 242 for the inverter device 90 (in the example shown in FIG. 4, only part of the side case portion 242) is located on the lower side V2 with respect to the second axis C2 when in the vehicle-mounted state. The entire side case portion 242 for the inverter device 90 may be located on the upper side V1 with respect to the second axis C2 when in the vehicle-mounted state as long as the position in the second direction Y of the side case portion 242 for the inverter device 90 overlaps the position in the second direction Y of the first output member 61 as viewed in the axial direction.

In the present embodiment, the first output member 61 is interposed between the rotating electrical machine 1 and the inverter device 90 in the first direction X at a position in the second direction Y where both the rotating electrical machine 1 and the inverter device 90 are disposed. Therefore, the areas in the second direction Y where the rotating electrical machine 1, the inverter device 90, and the output gear 30 disposed coaxially with the first output member 61 are disposed overlap each other, so that the overall size in the second direction Y of the vehicle drive device 100 can be reduced. In the present embodiment, the output gear 30 is disposed so as to overlap the rotating electrical machine 1 and the inverter device 90 as viewed in the axial direction. The space that overlaps the output gear 30 as viewed in the axial direction is thus effectively used while disposing the first output member 61 between the rotating electrical machine 1 and the inverter device 90 in the first direction X as described above. The rotating electrical machine 1 and the inverter device 90 can thus be disposed close to each other in the first direction X. Accordingly, the overall size in the first direction X of the vehicle drive device 100 can also be reduced.

As described above, according to the present embodiment, it is possible to reduce the overall sizes in the first direction X and the second direction Y of the vehicle drive device 100. That is, it is possible to reduce the dimensions of the vehicle drive device 100 as viewed in the axial direction. As a result, ease of mounting of the vehicle drive device 100 on the vehicle VC can be improved.

In the present embodiment, the rotating electrical machine 1 and the second inverter unit 92 of the inverter device 90 or the side case portion 242 are disposed on both sides in the first direction with respect to the first output member 61 disposed coaxially with the output gear 30. Therefore, both the percentage of overlap of the rotating electrical machine 1 with the output gear 30 as viewed in the axial direction and the percentage of overlap of the second inverter unit 92 of the inverter device 90 or the side case portion 242 with the output gear 30 as viewed in the axial direction can be easily increased. As a result, the dimensions of the vehicle drive device 100 as viewed in the axial direction can be easily reduced.

According to the present embodiment, the inverter case portion 24 in which the inverter device 90 is housed includes the upper case portion 241 and the side case portion 242. Therefore, its overall capacity (capacity of the inverter housing chamber S4) can be efficiently increased compared to the case where the inverter case portion 24 consists only of the upper case portion 241 or the side case portion 242. Efficient arrangement (layout) of the inverter device 90 can thus be implemented without increasing the overall sizes in the first direction X and the second direction Y of the vehicle drive device 100 due to the inverter device 90.

In particular, according to the present embodiment, the first inverter unit 91 of the inverter device 90 or the upper case portion 241 extends in a relatively wide range in the first direction X so as to overlap the second axis C2 of the first output member 61 as viewed in the second direction. In the illustrated example, the first inverter unit 91 of the inverter device 90 or the upper case portion 241 extends to a position on the first side X1 in the first direction with respect to the second axis C2 as viewed in the axial direction. The first inverter unit 91 with a relatively large size in the first direction X can therefore be disposed in the first inverter unit 91 or the upper case portion 241. In the case of the present embodiment, the first inverter unit 91 is the smoothing capacitor CM. However, the first inverter unit 91 may be the power module PM or may include both the first inverter unit 91 and the smoothing capacitor CM.

According to the present embodiment, various wires related to the inverter device 90 (e.g., a bus bar B1 as shown in FIG. 4) can be put together by using an area (corner area) that overlaps the corner portion 249 of the inverter case portion 24 as viewed in the axial direction. Such an area that overlaps the corner portion 249 of the inverter case portion 24 as viewed in the axial direction includes an area that overlaps the output gear 30 as viewed in the axial direction. Therefore, the various wires can be put together without increasing the dimensions of the vehicle drive device 100 as viewed in the axial direction. Accordingly, a connector etc. may be disposed in the area that overlaps the corner portion 249 of the inverter case portion 24 as viewed in the axial direction. The various wires to be put together may be any wires, but may include, for example, a high voltage wire (power supply wire) for receiving power supply from the high voltage battery BA (see FIG. 1) and a low voltage wire for a control system. Part or all of the various wires disposed in the area that overlaps the corner portion 249 of the inverter case portion 24 as viewed in the axial direction may be disposed outside the case 2 (inverter case portion 24). For example, in the example shown in FIG. 3, connectors CN10, CN11 are disposed in the area that overlaps the corner portion 249 of the inverter case portion 24 as viewed in the axial direction. In this case, the connector CN10 is disposed on the second side A2 in the axial direction, and the connector CN11 is disposed on the first side A1 in the axial direction. The male or female sides of the connectors CN10, CN11 may be fixed to the inverter case portion 24. The connectors CN10, CN11 may form a wire portion for electrically connecting a wire cable (not shown) disposed outside the case 2 and the inverter device 90. One of the connectors CN10, CN11 may be a connector for the high voltage wire for receiving power supply from the high voltage battery BA (see FIG. 1), and the other may be a connector for the low voltage wire for the control system. In this case, an appropriate insulation distance can be easily secured between the connectors CN10, CN11. In a modification, one of the connectors CN10, CN11 may be omitted.

In the present embodiment, a high voltage connector CN1 (see FIG. 4) for receiving power supply from the battery BA may be disposed on the first side Y1 in the second direction of the speed reduction mechanism 34. In this case, the connector CN1 can be disposed using a dead space that is likely to be formed on the first side Y1 in the second direction of the speed reduction mechanism 34 (dead space that does not affect the size in the second direction Y of the vehicle drive device 100). In this case, the high voltage connector CN1 (see FIG. 4) may be disposed in place of the high voltage connector out of the connectors CN10, CN11 shown in FIG. 3.

In the differential gear mechanism 5, the output gear 30 tends to have the largest size around the second axis C2 among the components of the differential gear mechanism 5. Therefore, in the case where the output gear 30 of the differential gear mechanism 5 is disposed more on the second side A2 in the axial direction, the space on the first side A1 in the axial direction with respect to the output gear 30 out of the space about the second axis C2 can be relatively large in the radial direction and continuous in the axial direction A, so that other components (e.g., channels described later etc.) can be efficiently arranged.

More specifically, in the present embodiment, the output gear 30, the differential case portion 50, and the first output member 61 are mainly provided around the second axis C2 in this order from the second side A2 in the axial direction toward the first side A1 in the axial direction. In this case, a mounting space around the second axis C2 (mounting space for other members) gradually increases from the second side A2 in the axial direction toward the first side A1 in the axial direction. That is, the mounting space around the second axis C2 (mounting space for other members) gradually increases from the second side A2 in the axial direction toward the first side A1 in the axial direction. Therefore, in the present embodiment, the vehicle drive device 100 may have a mount portion MT (mounting portion) on the body of the vehicle VC at a position in the axial direction A of the differential case portion 50 around the second axis C2. In this case, as shown in FIG. 4, the mount portion MT may be disposed in an area that overlaps the output gear 30 and the inverter device 90 (or the inverter case portion 24) as viewed in the axial direction. The mount portion MT can thus be efficiently implemented by using a space that tends to be a dead space around the second axis C2. The mount portion MT may be provided outside the case 2.

In the present embodiment, as described above, the mounting space around the second axis C2 (mounting space for other members) gradually increases from the second side A2 in the axial direction toward the first side A1 in the axial direction. Accordingly, the dimension in the second direction Y of the upper case portion 241 for the inverter device 90 (dimension in the second direction Y of the second inverter housing chamber S42) can also be gradually increased from the second side A2 in the axial direction toward the first side A1 in the axial direction without changing the position furthest to the first side Y1 in the second direction of the upper case portion 241. In this case, various components of the inverter device 90 may be disposed in the upper case portion 241 in such a manner that the component located on the first side A1 in the axial direction has a smaller dimension in the second direction Y than the component located on the second side A2 in the axial direction.

In the present embodiment, the control board of the inverter device 90 may be disposed on the first side Y1 in the second direction of the output gear 30. In this case, the control board may be disposed in such an orientation that the second direction Y coincides with a normal direction. In this case, since the control board has a relatively small dimension in the second direction Y, the inverter case portion 24 may still be able to be disposed on the second side Y2 in the second direction with respect to the position furthest to the first side Y1 in the second direction of the differential cover member 202.

Figure 7:
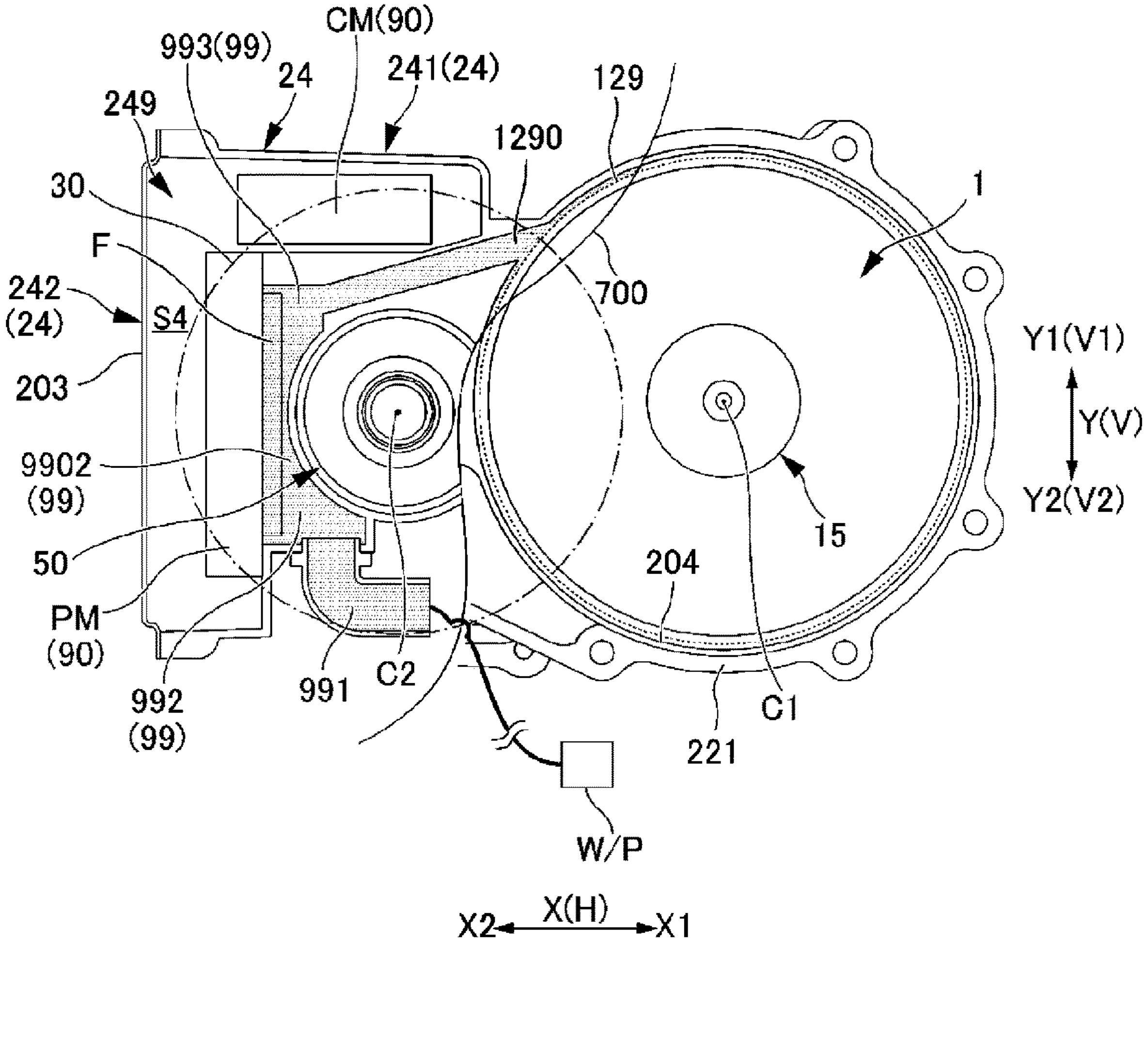
FIG. 7 is a diagram schematically showing the inside of the vehicle drive device according to the first embodiment as viewed in the axial direction from the first side in the axial direction.

Next, an oil lubrication structure and cooling structure in the vehicle drive device 100 of the present embodiment will be schematically described with reference to FIGS. 6 and 7.

FIG. 6 is a diagram schematically showing the vehicle drive device 100 as viewed in the axial direction from the first side A1 in the axial direction, in which the vehicle drive device 100 is shown partially transparent to show the inside. FIG. 6 is a modification made to an oil-cooled structure shown in FIG. 5, showing a water-cooled type. FIG. 7 is a diagram schematically showing the inside of the vehicle drive device 100 as viewed in the axial direction from the first side A1 in the axial direction (inside as viewed in a section taken along line Q-Q in FIG. 3), in which the areas on both sides of a line 700 are the areas offset from each other in the axial direction A to show different portions. A water pump W/P is also schematically shown in FIG. 7. In FIG. 7, the outer periphery of the output gear 30 is shown by a long dashed short dashed line in order to illustrate the positional relationship.

In the present embodiment, the rotating electrical machine 1 may be of an oil-cooled type, a water-cooled type, or a combined type thereof. In the case of the oil-cooled type, the inverter housing chamber S4 may be sealed in such a manner that it does not fluidically communicate with the motor housing chamber S1, the transmission mechanism housing chamber S2, and the output shaft housing chamber S3. In this case, as shown in FIG. 5, the motor housing chamber S1 and the output shaft housing chamber S3 may communicate with each other with no partition wall portion formed therebetween. In this case, a wire connection portion 600 between the rotating electrical machine 1 and the inverter device 90 may be provided so as to extend through a partition wall portion 29 in the axial direction A that separates the motor housing chamber S1 or the output shaft housing chamber S3 and the inverter housing chamber S4 from each other. The wire connection portion 600 may be in the form of a high voltage connector or terminal block for connecting the rotating electrical machine 1 and the power module PM of the inverter device 90. The wire connection portion 600 may be disposed in the area that overlaps the output gear 30 as viewed in the axial direction.

On the other hand, in the case of the water-cooled type, the inverter housing chamber S4 may fluidically communicate with the motor housing chamber S1 etc. In this case, for example, as shown in FIG. 6, part or all of a wall portion that separates the inverter housing chamber S4 and the motor housing chamber S1 from each other (wall portion such as the partition wall portion 29 in FIG. 5) may be eliminated, which makes it easy to route wires between the rotating electrical machine 1 and the inverter device 90. For example, in the example shown in FIG. 6, the wire connection portion 600 between the rotating electrical machine 1 and the inverter device 90 is provided so as to extend in both the inverter housing chamber S4 and the motor housing chamber S1. In this case, as shown in FIG. 6, a partition wall portion 28 may be formed between the motor housing chamber S1 and the output shaft housing chamber S3.

In the case where the rotating electrical machine 1 is of the water-cooled type, a coolant channel may be formed around the outer periphery of the stator core 12 (hereinafter referred to as "motor coolant channel 129" for distinguishing purpose). In this case, the motor coolant channel 129 may be formed in the case member 200 or may be formed in a different support member 204 coupled to the case member 200 (component of the motor case portion 21 of the case 2). In this case, the different support member 204 may have a cylindrical shape, may be made of a highly thermally conductive material such as aluminum, and may be integrated with the radially outer side of the stator core 12 by shrink fitting, casting, etc. Thermal resistance between the support member 204 and the stator core 12 can thus be reduced, so that the coil etc. can be efficiently cooled through the stator core 12. In this case, the different support member 204 may be integrated with the case member 200 by fastening etc. In the case where the rotor shaft 15 is a hollow shaft with an axial hole, the motor coolant channel 129 may communicate with the axial hole of the rotor shaft 15.

In the present embodiment, the inverter case portion 24 of the case 2 includes a coolant channel through which a coolant for cooling the inverter device 90 (coolant including, for example, a long-life coolant) passes (hereinafter referred to as "inverter coolant channel 99" for distinguishing purpose).

The inverter coolant channel 99 may be disposed in the area that overlaps the output gear 30 as viewed in the axial direction. In this case, efficient arrangement (layout) of the inverter coolant channel 99 can be implemented without increasing the overall sizes in the first direction X and the second direction Y of the vehicle drive device 100 due to the inverter coolant channel 99.

In the case where the smoothing capacitor CM of the inverter device 90 is disposed in the upper case portion 241, the inverter coolant channel 99 may include a channel portion extending in an area that overlaps part or all of the smoothing capacitor CM as viewed in the second direction (hereinafter also referred to as "upper channel portion") (example of a capacitor cooling portion). In this case, the upper channel portion may be disposed on the second side Y2 in the second direction with respect to the smoothing capacitor CM. In this case, the upper channel portion may be formed in the first wall portion 251 of the peripheral wall portion 250 described above.

In the case where the power module PM of the inverter device 90 is disposed in the side case portion 242, the inverter coolant channel 99 may include a channel portion extending in an area that overlaps part or all of the power module PM as viewed in the first direction (hereinafter also referred to as "side channel portion 9902") (example of a power module cooling portion). In this case, the side channel portion 9902 may be disposed on the first side X1 in the first direction with respect to the power module PM. In this case, the side channel portion 9902 may be formed in the second wall portion 252 of the peripheral wall portion 250 described above. A plurality of fins F may be formed on the surface on the first side X1 in the first direction of a casing of the power module PM (surface that contacts the coolant in the inverter coolant channel 99).

In the case where the power module PM of the inverter device 90 is disposed in the side case portion 242, the side channel portion 9902 together with the power module PM may extend in the second direction Y from a position on the second side Y2 in the second direction with respect to the central axis of the first output member 61 (i.e., the second axis C2) to a position on the first side Y1 in the second direction with respect to this central axis (i.e., the second axis C2). At each position along the second direction Y, the separation distance in the first direction X between the side case portion 242 and the differential case portion 50 that extend in the axial direction A and the second direction Y is the smallest at a position that overlaps the central axis of the differential case portion 50 (i.e., the second axis C2) as viewed in the first direction, and gradually increases as it gets farther away from the position that overlaps the central axis of the differential case portion 50 toward the first side Y1 in the second direction or the second side Y2 in the second direction. By using this, the side channel portion 9902 of the inverter coolant channel 99 may include an inlet portion 991 and a chamber portion 992 in an area where the separation distance in the first direction X from the differential case portion 50 is relatively large (e.g., an area on the second side Y2 in the second direction with respect to the first output member 61 as viewed in the axial direction). The inlet portion 991 is a portion into which a coolant discharged from the water pump W/P (see FIG. 7) is introduced. Hereinafter, the terms "upstream" and "downstream" are used based on the flow of the coolant.

The chamber portion 992 may extend in the axial direction along the entire length in the axial direction A of the side channel portion 9902 of the inverter coolant channel 99. The chamber portion 992 has a significantly larger sectional area than the inlet portion 991, and has a significantly smaller resistance than a channel portion that contacts the power module PM (e.g., a channel around the fins F). The sectional area at each position in the second direction of the inverter coolant channel 99 is a sectional area taken along a plane perpendicular to a flow direction, and in this case, corresponds to a sectional area taken along a plane perpendicular to the second direction.

Therefore, providing such a chamber portion 992 adjacent to the downstream side of the inlet portion 991 can effectively secure a required flow rate of the coolant that is introduced into the inverter coolant channel 99. A chamber 993 similar to the chamber portion 992 may be provided downstream of the channel portion of the side channel portion 9902 of the inverter coolant channel 99 that contacts the power module PM.

In the case where the motor coolant channel 129 described above is provided, the inverter coolant channel 99 may communicate with the motor coolant channel 129. In this case, the inverter coolant channel 99 may be disposed upstream of the motor coolant channel 129, and in this case, the motor coolant channel 129 may include an outlet portion (not shown) for returning the coolant to the water pump W/P. The outlet portion (not shown) together with the inlet portion 991 described above may be disposed in the area that overlaps the output gear 30 as viewed in the axial direction. Efficient arrangement of the inverter coolant channel 99 can thus be implemented without increasing the overall sizes in the first direction X and the second direction Y of the vehicle drive device 100 due to the inverter coolant channel 99.

In the case where the motor coolant channel 129 described above is provided, a channel for connecting the inverter coolant channel 99 and the motor coolant channel 129 (hereinafter also referred to as "connection channel 1290") may be formed in the case 2. That is, the connection channel 1290 may be implemented as an in-case channel, like the motor coolant channel 129 and the inverter coolant channel 99. The connection channel 1290 may extend in the axial direction A and the first direction X. Alternatively, the connection channel 1290 may extend in the axial direction A, the first direction X, and the second direction Y. In this case, the connection channel 1290 may be formed in a portion of the case 2 where the motor case portion 21 and the transmission mechanism case portion 22 or the output shaft case portion 23 are formed. The connection channel 1290 may be disposed above the first output member 61 as viewed in the axial direction in the area that overlaps the output gear 30 as viewed in the axial direction.

Hereinafter, a vehicle drive device 100A according to a second embodiment will be described with reference to FIG. 8 and the subsequent figures. In the following description of the second embodiment and its associated figures, constituent elements that may be substantially the same as those in the first embodiment described above may be denoted by the same reference signs as those of the first embodiment, and description thereof may be omitted.

Figure 8:
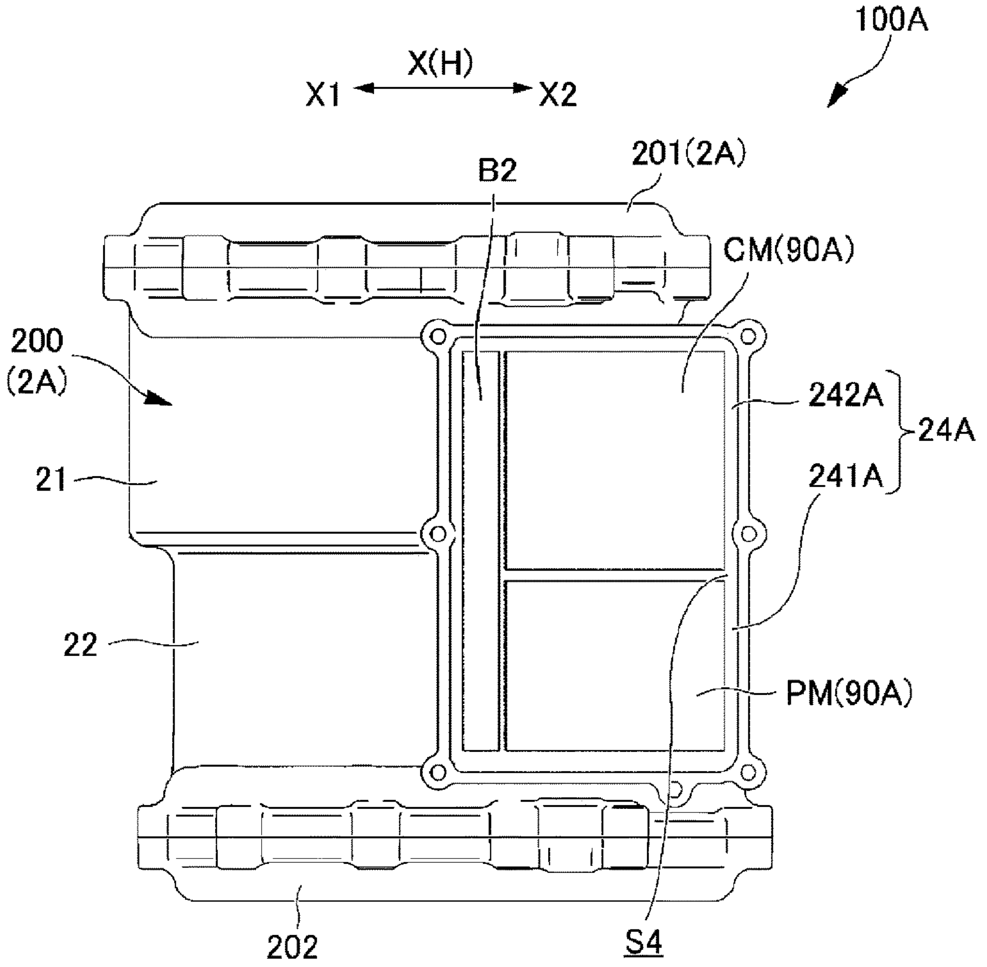
FIG. 8 is a two-view diagram schematically showing a vehicle drive device according to a second embodiment.
Figure 8:
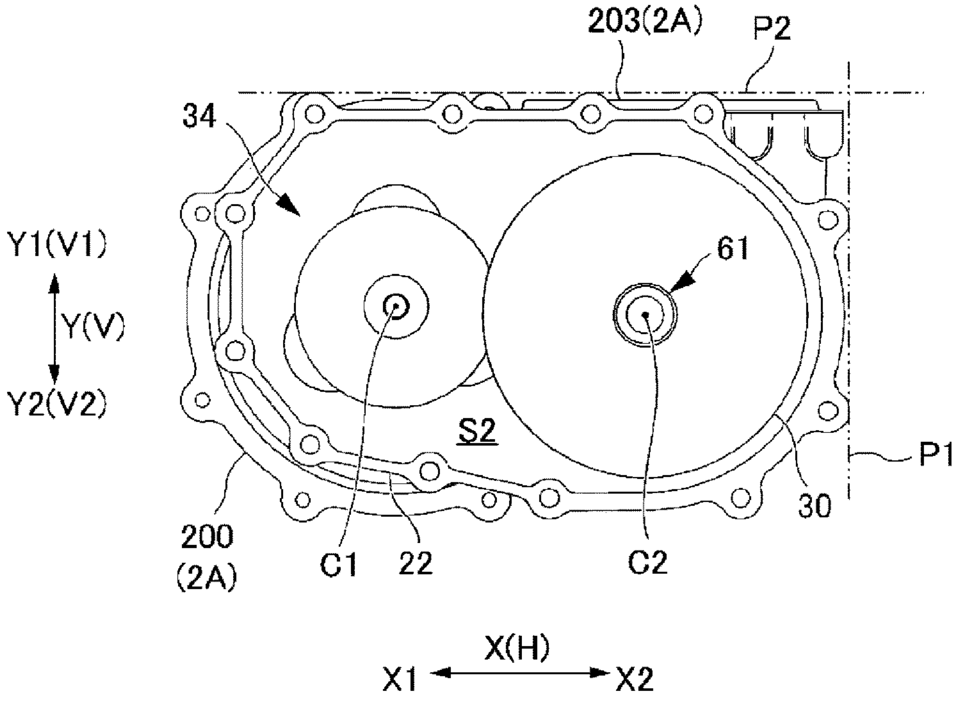
Figure 9:
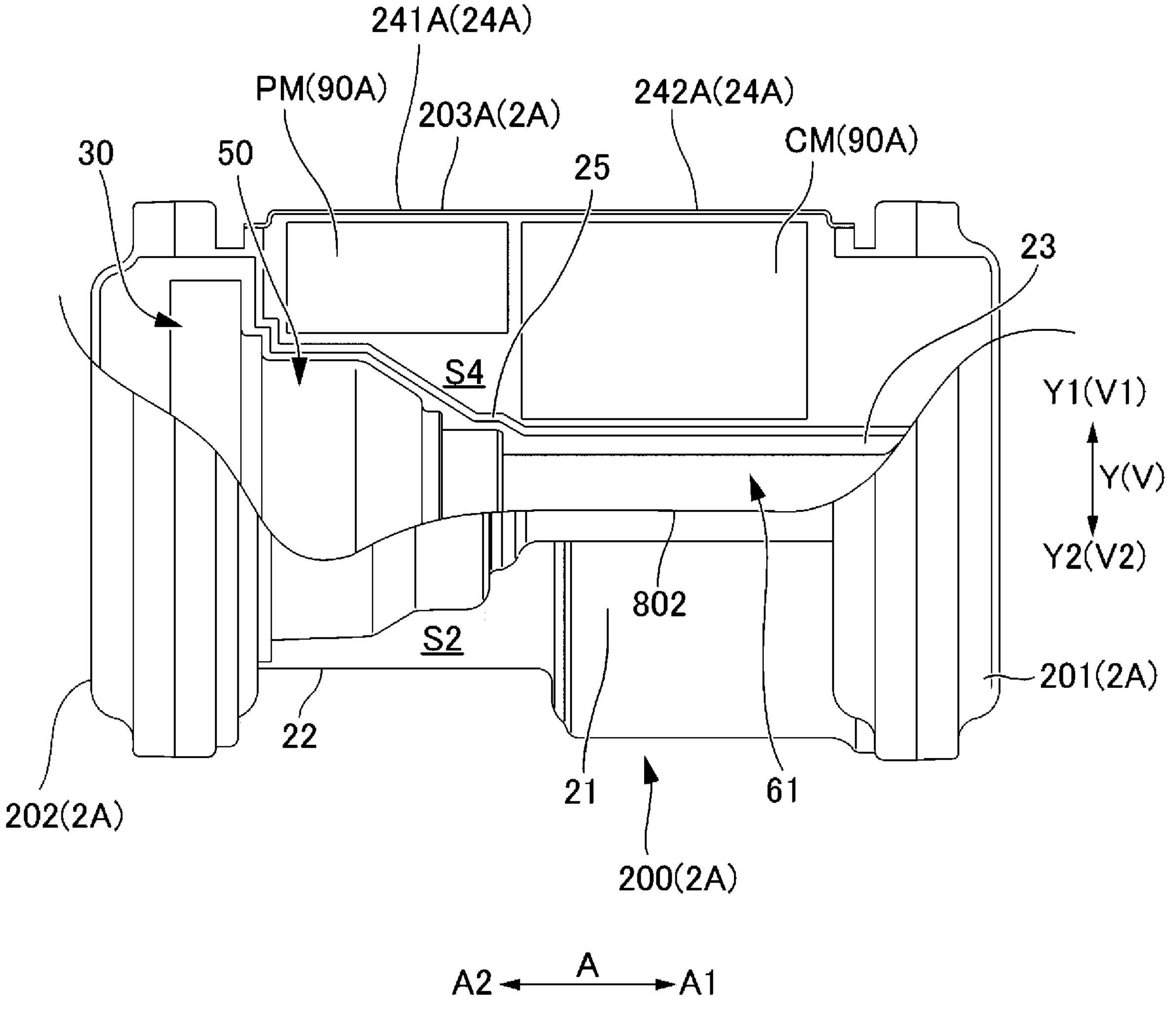
FIG. 9 is a diagram schematically showing the vehicle drive device according to the second embodiment as viewed in a direction perpendicular to the two directions of the two-view diagram in FIG. 8.
Figure 10:
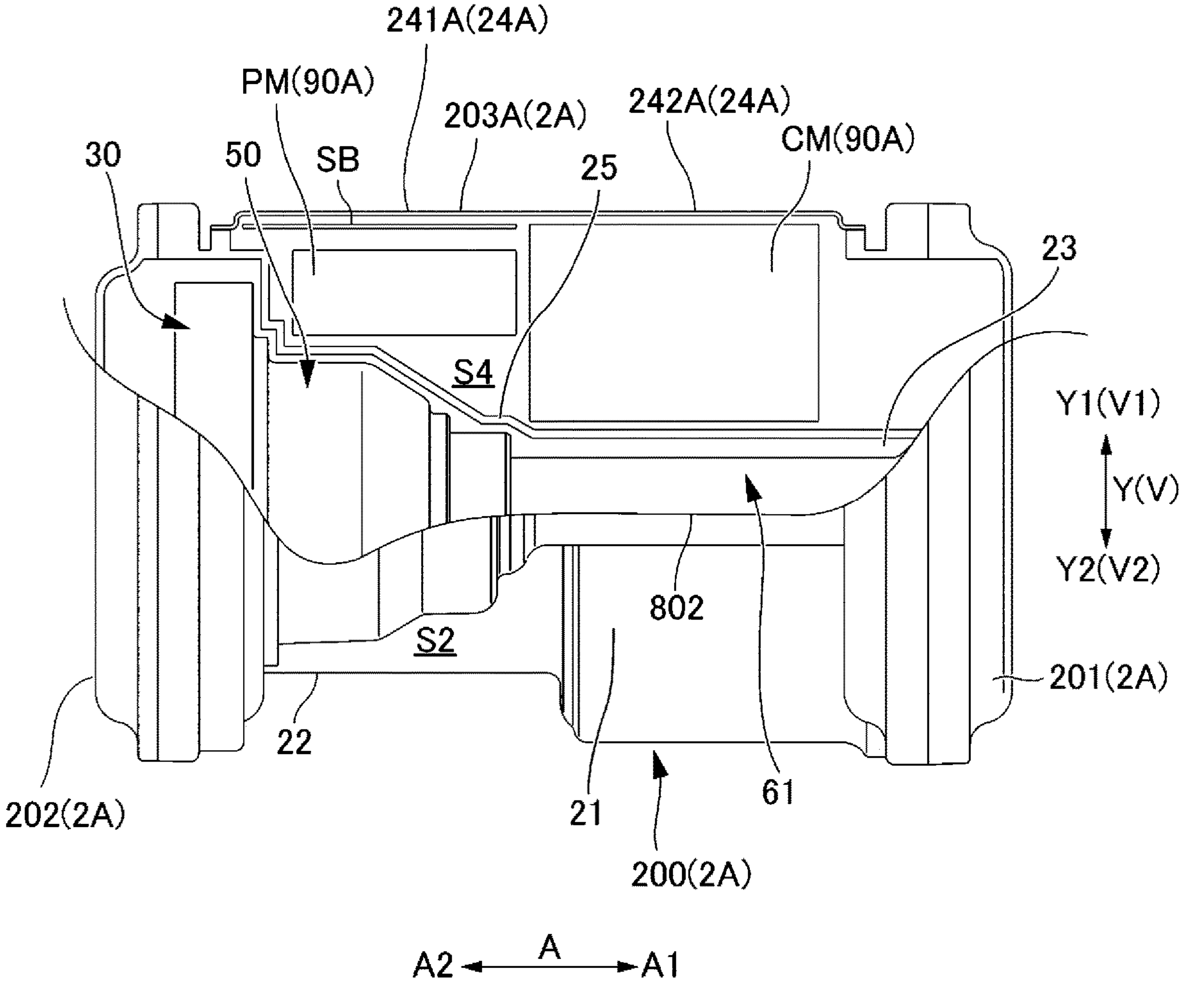
FIG. 10 is an illustration of a modification made to FIG. 9.

FIG. 8 is a two-view diagram schematically showing the vehicle drive device 100A according to the present embodiment, FIG. 9 is a diagram schematically showing the vehicle drive device 100A as viewed in a direction perpendicular to the two directions of the two-view diagram in FIG. 8 (i.e., as viewed in the first direction), and FIG. 10 is an illustration of a modification made to FIG. 9. In FIGS. 9 and 10, the areas on both sides of a line 802 are the areas offset from each other in the first direction X to show different portions.

The vehicle drive device 100A according to the second embodiment is mainly different from the vehicle drive device 100 according to the first embodiment described above in the arrangement of the inverter device and the inverter case portion etc. Specifically, the vehicle drive device 100A according to the second embodiment is different from the vehicle drive device 100 according to the first embodiment described above in that the case 2 and the inverter device 90 are replaced with a case 2A and an inverter device 90A, respectively.

The case 2A is different from the case 2 according to the first embodiment described above in that the inverter case portion 24 is replaced with an inverter case portion 24A.

In the present embodiment, unlike the shape of the inverter case portion 24 of the first embodiment described above (L-shape as viewed in the axial direction), the inverter case portion 24A extends only on the first side Y1 in the second direction with respect to the first output member 61 as viewed in the axial direction.

Specifically, the inverter case portion 24A extends in the first direction X and the axial direction A, and forms the inverter housing chamber S4 inside. In this case, as shown in FIGS. 8 and 9, the inverter case portion 24A extends in the axial direction A so as to face the differential case portion 50 and the first output member 61 in the second direction Y. That is, the inverter case portion 24A extends so as to cover the first side Y1 in the second direction of the differential case portion 50 in the transmission mechanism case portion 22 and the first side Y1 in the second direction of the first output member 61 in the output shaft case portion 23. In this way, the inverter case portion 24A extends in the first direction X and the axial direction A, and overlaps the output gear 30 as viewed in the axial direction.

The inverter case portion 24A is preferably formed so as not to affect the overall size in the second direction Y of the case 2A in order to prevent an increase in overall size of the case 2A. In the present embodiment, the overall size in the second direction Y of the case 2A is determined by the size in the second direction Y of the rotating electrical machine 1, and specifically, is determined by the size in the second direction Y of the motor case portion 21. Therefore, the inverter case portion 24A is disposed on the second side Y2 in the second direction with respect to the position furthest to the first side Y1 in the second direction of the motor case portion 21 (see line P2 in FIG. 8). In this case, the overall size in the second direction Y of the case 2A can be reduced.

The inverter case portion 24A is preferably disposed between both end faces of the case member 200 in the axial direction A. That is, the inverter case portion 24A is preferably disposed between the joint surface (mating surface) 221 between the motor cover member 201 and the case member 200 and the joint surface (mating surface) 222 between the differential cover member 202 and the case member 200 in the axial direction A. In this case, it is easier to dispose the inverter case portion 24A on the second side Y2 in the second direction with respect to the position furthest to the first side Y1 in the second direction of the differential cover member 202, compared to the case where the inverter case portion is formed so as to protrude beyond both end faces of the case member 200 in the axial direction A. That is, since the inverter case portion 24A can be made to extend below the flanges of the mating surfaces 221, 222, the inverter case portion 24A can be easily disposed on the second side Y2 in the second direction with respect to the position furthest to the first side Y1 in the second direction of the differential cover member 202.

The inverter case portion 24A is preferably formed so as not to affect the overall size in the first direction X of the case 2A in order to prevent an increase in overall size of the case 2A. In the present embodiment, the boundary (outer shape) on the second side X2 in the first direction of the overall size in the first direction X of the case 2A is determined by the size of the differential gear mechanism 5, and specifically, is determined by the size in the first direction X of the transmission mechanism case portion 22. Therefore, the inverter case portion 24A or the inverter device 90A is disposed on the first side X1 in the first direction (side closer to the rotating electrical machine 1) with respect to the position furthest to the second side X2 in the first direction of the transmission mechanism case portion 22 (end position on the second side X2 in the first direction, see line P1 in FIG. 8). In this case, the overall size in the first direction X of the case 2A can be reduced.

In a modification, part of the inverter case portion 24A or part of the inverter device 90A may protrude beyond the position furthest to the second side X2 in the first direction of the transmission mechanism case portion 22 (end position on the second side X2 in the first direction) toward the second side X2 in the first direction. In this case, an increase in size due to the protruding part can be minimized by disposing the relatively large power module PM and smoothing capacitor CM out of the various components of the inverter device 90A on the first side X1 in the first direction (side closer to the rotating electrical machine 1) with respect to the position furthest to the second side X2 in the first direction of the transmission mechanism case portion 22 (end position on the second side X2 in the first direction).

As shown in FIG. 8, in the present embodiment as well, the rotating electrical machine 1 and the inverter device 90A or the inverter case portion 24A are arranged so that the areas in the vertical direction V where the rotating electrical machine 1 and the inverter device 90A or the inverter case portion 24A are disposed overlap each other. Therefore, as an example, a horizontal direction H perpendicular to the axial direction A (in other words, a direction perpendicular to the axial direction A and the vertical direction V) can be defined as the first direction X. In this case, as shown in FIG. 8, the second direction Y is parallel to the vertical direction V. As another example, a direction along an imaginary straight line passing through the first axis C1 and the center of the first inverter unit 91 or inverter case portion 24A as viewed in the axial direction can also be defined as the first direction X. The "center of the first inverter unit 91 or inverter case portion 24A as viewed in the axial direction" can be herein the center of gravity of a figure defining the outer shape (outer edge) of the first inverter unit 91 or inverter case portion 24A as viewed in the axial direction. In the example shown in FIG. 8, the horizontal direction H perpendicular to the axial direction A and the direction along the imaginary straight line as viewed in the axial direction are parallel to each other. That is, in the example shown in FIG. 8 the first direction X is defined as the same direction by either of the above two definitions.

As shown in FIG. 8, the output gear 30 is disposed so as to overlap the rotating electrical machine 1 and the inverter device 90A as viewed in the axial direction. Specifically, the output gear 30 is disposed so that a portion on the first side X1 in the first direction of the output gear 30 overlaps the rotating electrical machine 1 as viewed in the axial direction and a portion on the first side Y1 in the second direction of the output gear 30 overlaps the inverter device 90A as viewed in the axial direction. As shown in FIG. 8, the output gear 30 is disposed on one side in the axial direction A (specifically, the second side A2 in the axial direction) with respect to the rotating electrical machine 1 and the inverter device 90A. The rotating electrical machine 1 and the inverter device 90A may be disposed so that the areas in the axial direction A where the rotating electrical machine 1 and the inverter device 90A are disposed overlap each other.

In the present embodiment, the inverter device 90A or the inverter case portion 24A may be disposed on the second side X2 in the first direction with respect to the rotating electrical machine 1. That is, the inverter device 90A or the inverter case portion 24A may be disposed in an area that overlaps a portion of the transmission mechanism 3 located around the second axis C2 (transmission mechanism 3 other than the speed reduction mechanism 34) as viewed in the second direction. However, the areas in the first direction X where a portion on the first side X1 in the first direction of the inverter device 90A or inverter case portion 24A and a portion on the second side X2 in the first direction of the rotating electrical machine 1 or speed reduction mechanism 34 are disposed may overlap each other.

According to the present disclosure, the areas where the rotating electrical machine 1, the inverter device 90A, and the output gear 30 disposed coaxially with the first output member 61 are disposed overlap each other, so that the overall size in the second direction Y of the vehicle drive device 100 can be reduced. That is, the rotating electrical machine 1 and the inverter device 90A can be disposed close to each other in the first direction X by effectively using the space that overlaps the output gear 30 as viewed in the axial direction. Accordingly, the overall size in the first direction X of the vehicle drive device 100 can also be reduced. Disposing the rotating electrical machine 1 and the inverter device 90A close to each other in the first direction X makes it easy to route wires for electrical connection between the rotating electrical machine 1 and the inverter device 90A.

As described above, according to the present embodiment, it is possible to reduce the overall sizes in the first direction X and the second direction Y of the vehicle drive device 100. That is, it is possible to reduce the dimensions of the vehicle drive device 100 as viewed in the axial direction. As a result, ease of mounting of the vehicle drive device 100 on the vehicle VC can be improved.

In the present embodiment, as described above, the mounting space around the second axis C2 (mounting space for other members) gradually increases from the second side A2 in the axial direction toward the first side A1 in the axial direction. Accordingly, as shown in FIG. 9, the dimension in the second direction Y of the inverter case portion 24A for the inverter device 90A (dimension in the second direction Y of the second inverter housing chamber S42) can also be gradually increased from the second side A2 in the axial direction toward the first side A1 in the axial direction without changing the position furthest to the first side Y1 in the second direction of the inverter case portion 24A. In this case, the various components of the inverter device 90A may be disposed in the inverter case portion 24A in such a manner that the component located on the first side A1 in the axial direction has a smaller dimension in the second direction Y than the component located on the second side A2 in the axial direction.

Specifically, as shown in FIG. 9, the inverter case portion 24A may include a differential-side case portion 241A that overlaps the differential case portion 50 as viewed in the second direction, and an intermediate-side case portion 242A that overlaps the first output member 61 as viewed in the second direction, and the intermediate-side case portion 242A may be designed to have a larger dimension in the second direction Y than the differential-side case portion 241A. In this case, the various components of the inverter device 90A that may have significant differences in dimension in the second direction Y can be efficiently arranged. The differential-side case portion 241A and the intermediate-side case portion 242A may internally communicate with each other.

In the present embodiment, as a preferred example, as shown in FIG. 9, the power module PM is disposed in the differential-side case portion 241A, and the smoothing capacitor CM is disposed in the intermediate-side case portion 242A. Such an arrangement is suitable when the thickness (height) of a required mounting space is greater for the smoothing capacitor CM than for the power module PM. In the example shown in FIG. 8, a bus bar B2 is provided on the first side X1 in the first direction of the power module PM and the smoothing capacitor CM in the inverter case portion 24A so as to extend in the axial direction A.

In the present embodiment, a high voltage connector (not shown) for receiving power supply from the battery BA (see FIG. 1) may be disposed on the first side Y1 in the second direction of the speed reduction mechanism 34. In this case, the connector CN1 can be disposed using a dead space that is likely to be formed on the first side Y1 in the second direction of the speed reduction mechanism 34 (dead space that does not affect the size in the second direction Y of the vehicle drive device 100). Alternatively, the high voltage connector together with part of the components of the inverter device 90A (relatively small component other than the power module PM and the smoothing capacitor CM, such as a filter) may be disposed on the second side X2 in the first direction with respect to the power module PM or the smoothing capacitor CM. In this case, these components may protrude beyond the position furthest to the second side X2 in the first direction of the transmission mechanism case portion 22 (end position on the second side X2 in the first direction) toward the second side X2 in the first direction.

In the present embodiment, as shown in FIG. 10, the control board SB of the inverter device 90A may be disposed on the first side Y1 in the second direction of the output gear 30. That is, the control board SB may be disposed on the first side Y1 in the second direction of the output gear 30 so as to overlap the output gear 30 as viewed in the second direction. In this case, the control board SB may be disposed in such an orientation that the second direction Y coincides with a normal direction. In this case, since the control board SB has a relatively small dimension in the second direction Y, the inverter case portion 24A (inverter cover member 203A) may still be able to be disposed on the second side Y2 in the second direction with respect to the position furthest to the first side Y1 in the second direction of the differential cover member 202.

Next, an oil lubrication structure and cooling structure in the vehicle drive device 100 of the present embodiment will be schematically described with reference to FIGS. 11 and 12.

Figure 11:
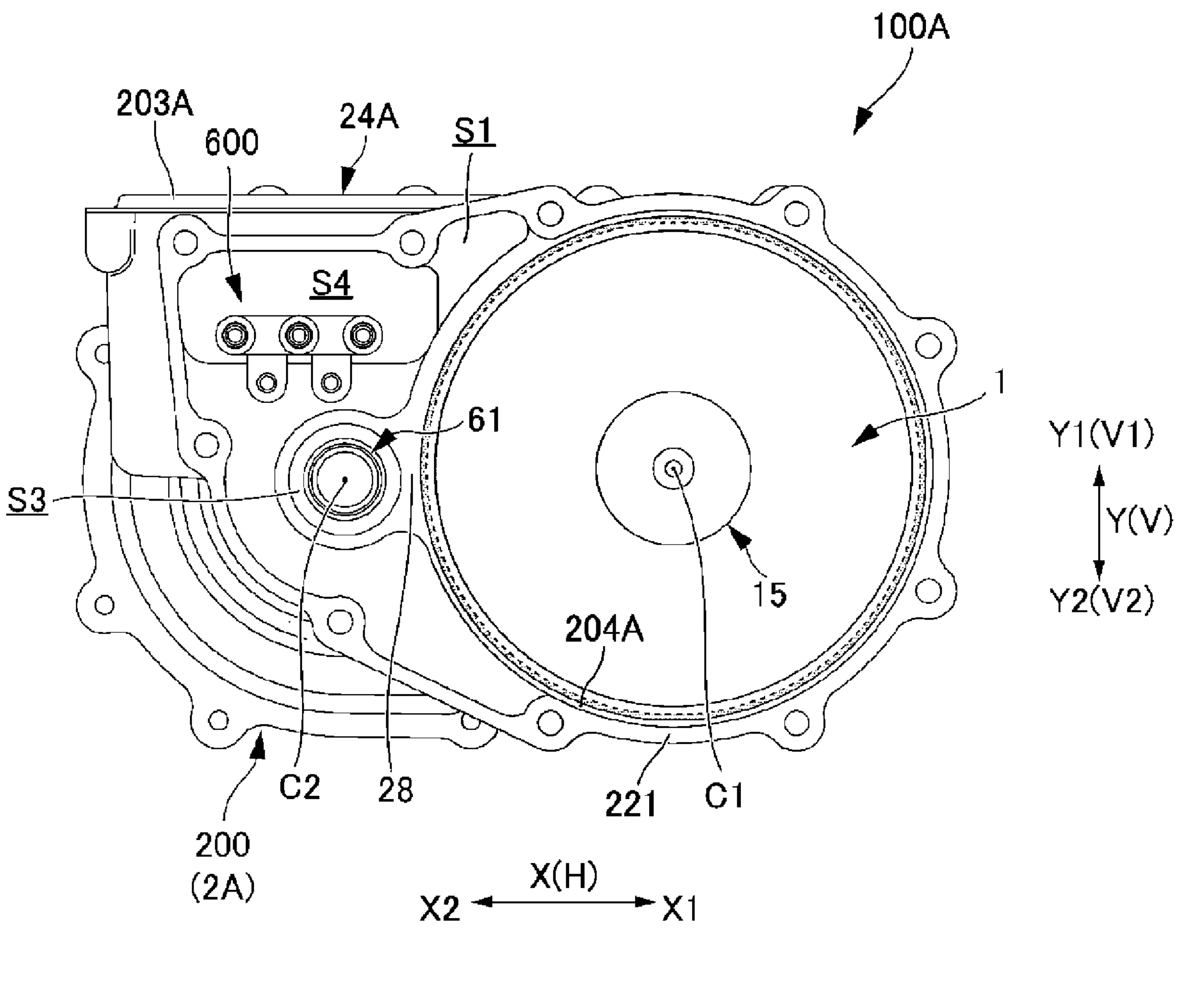
FIG. 11 is a diagram schematically showing the vehicle drive device according to the second embodiment as viewed in the axial direction from the first side in the axial direction.
Figure 12:
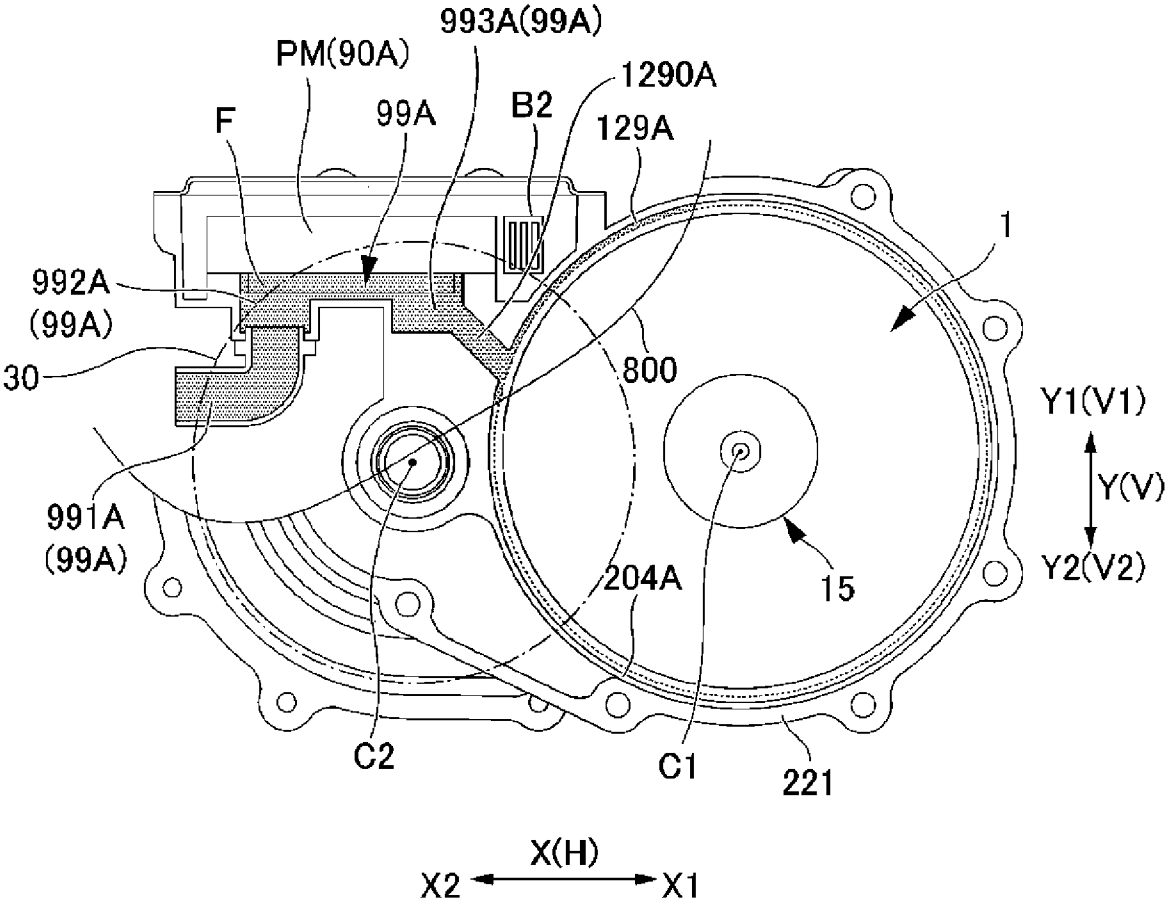
FIG. 12 is a diagram schematically showing the inside of the vehicle drive device according to the second embodiment as viewed in the axial direction from the first side in the axial direction.

FIG. 11 is a diagram schematically showing the vehicle drive device 100A as viewed in the axial direction from the first side A1 in the axial direction, in which the vehicle drive device 100A is shown partially transparent to show the inside. FIG. 12 is a diagram schematically showing the vehicle drive device 100A as viewed in the axial direction from the first side A1 in the axial direction, in which the areas on both sides of a line 800 are the areas offset from each other in the axial direction A to show different portions. In FIG. 12, the outer periphery of the output gear 30 is shown by a long dashed short dashed line in order to illustrate the positional relationship.

In the present embodiment, the rotating electrical machine 1 may be of an oil-cooled type, a water-cooled type, or a combined type thereof. In the case of the oil-cooled type, the inverter housing chamber S4 may be sealed in such a manner that it does not fluidically communicate with the motor housing chamber S1, the transmission mechanism housing chamber S2, and the output shaft housing chamber S3. In this case, the motor housing chamber S1 and the output shaft housing chamber S3 may communicate with each other with no partition wall portion formed therebetween. In this case, the wire connection portion 600 between the rotating electrical machine 1 and the inverter device 90A may be provided so as to extend through a partition wall portion (not shown) in the axial direction A that separates the motor housing chamber S1 or the output shaft housing chamber S3 and the inverter housing chamber S4 from each other. The wire connection portion 600 may be in the form of a high voltage connector or terminal block for connecting the rotating electrical machine 1 and the power module PM of the inverter device 90A.

On the other hand, in the case of the water-cooled type, the inverter housing chamber S4 may fluidically communicate with the motor housing chamber S1 etc. In this case, for example, as shown in FIG. 6, part or all of a wall portion that separates the inverter housing chamber S4 and the motor housing chamber S1 from each other may be eliminated, which makes it easy to route wires between the rotating electrical machine 1 and the inverter device 90A. For example, in the example shown in FIGS. 11 and 12, the rotating electrical machine 1 is of the water-cooled type, and the wire connection portion 600 between the rotating electrical machine 1 and the inverter device 90A is provided so as to extend in both the inverter housing chamber S4 and the motor housing chamber S1. In this case, as shown in FIG. 11, the partition wall portion 28 may be formed between the motor housing chamber S1 and the output shaft housing chamber S3.

In the example shown in FIGS. 11 and 12, a coolant channel is formed around the outer periphery of the stator core 12 (hereinafter referred to as “motor coolant channel 129A” for distinguishing purpose). In this case, the motor coolant channel 129A may be formed in the case member 200 or may be formed in a different support member (component of the motor case portion 21 of the case 2A) 204A coupled to the case member 200. In this case, the support member 204A may have a cylindrical shape, and may be integrated with the radially outer side of the stator core 12 by shrink fitting, casting, etc. In this case, the support member 204A may be integrated with the case member 200 by fastening etc. In the case where the rotor shaft 15 is a hollow shaft with an axial hole, the motor coolant channel 129A may communicate with the axial hole of the rotor shaft 15.

In the present embodiment, the inverter case portion 24A of the case 2A includes a coolant channel through which a coolant for cooling the inverter device 90A passes (hereinafter referred to as “inverter coolant channel 99A” for distinguishing purpose).

The inverter coolant channel 99A may be disposed in the area that overlaps the output gear 30 as viewed in the axial direction. In this case, efficient arrangement (layout) of the inverter coolant channel 99A can be implemented without increasing the overall sizes in the first direction X and the second direction Y of the vehicle drive device 100 due to the inverter coolant channel 99A.

The inverter coolant channel 99A may include a channel portion extending in an area that overlaps all or part of the smoothing capacitor CM as viewed in the second direction. Preferably, however, the inverter coolant channel 99A may not include a channel portion extending in the area that overlaps all or part of the smoothing capacitor CM as viewed in the second direction and may extend in an area that overlaps all or part of the power module PM as viewed in the second direction. That is, the inverter coolant channel 99A may be disposed on the second side A2 in the axial direction with respect to the smoothing capacitor CM. In this case, the inverter coolant channel 99A may be formed in the partition wall portion 28 of the case 2A that separates the inverter housing chamber S4 and the transmission mechanism housing chamber S2 from each other.

In the present embodiment, the smoothing capacitor CM is disposed in an area that overlaps the first output member 61 as viewed in the second direction, and is disposed relatively far away from the rotating electrical machine 1 that is a main heat source other than a heat source in the inverter case portion 24A. Therefore, even in the arrangement in which the inverter coolant channel 99A does not overlap the smoothing capacitor CM as viewed in the second direction, the smoothing capacitor CM can be appropriately cooled via the inverter case portion 24A that is cooled by the coolant in the inverter coolant channel 99A. Therefore, according to such an arrangement in which the inverter coolant channel 99A does not overlap the smoothing capacitor CM as viewed in the second direction, efficient arrangement of the inverter coolant channel 99A can be implemented without significantly reducing the cooling performance of the smoothing capacitor CM.

The inverter coolant channel 99A may include an inlet portion 991A and a chamber portion 992A in an area where the separation distance in the first direction X from the differential case portion 50 is relatively large (e.g., an area on the second side Y2 in the second direction with respect to the first output member 61 as viewed in the axial direction). The inlet portion 991A is a portion into which a coolant discharged from a water pump, not shown, (see the water pump W/P in FIG. 7) is introduced.

The chamber portion 992A may extend in the axial direction along the entire length in the axial direction A of the inverter coolant channel 99A. The chamber portion 992A has a significantly larger sectional area (and capacity) than the inlet portion 991A, and has a significantly smaller resistance than a channel portion that contacts the power module PM (e.g., a channel around the fins F). Therefore, providing such a chamber portion 992A adjacent to the downstream side of the inlet portion 991A can effectively secure a required flow rate of the coolant that is introduced into the inverter coolant channel 99A. A chamber 993A similar to the chamber portion 992A may be provided downstream of the channel portion of the inverter coolant channel 99A that contacts the power module PM.

In the case where the motor coolant channel 129A described above is provided, the inverter coolant channel 99A may communicate with the motor coolant channel 129A. In this case, the inverter coolant channel 99A may be disposed upstream of the motor coolant channel 129A, and in this case, the motor coolant channel 129A may include an outlet portion (not shown) for returning the coolant to the water pump, not shown. The outlet portion (not shown) together with the inlet portion 991A described above may be disposed in the area that overlaps the output gear 30 as viewed in the axial direction. In this case, efficient arrangement of the inverter coolant channel 99A can be implemented without increasing the overall sizes in the first direction X and the second direction Y of the vehicle drive device 100 due to the inverter coolant channel 99A.

In the case where the motor coolant channel 129A described above is provided, a channel for connecting the inverter coolant channel 99A and the motor coolant channel 129A (hereinafter also referred to as "connection channel 1290A") may be formed in the case 2A. That is, the connection channel 1290A may be implemented as an in-case channel, like the motor coolant channel 129A and the inverter coolant channel 99A. The connection channel 1290A may extend in the axial direction A and the first direction X. Alternatively, the connection channel 1290A may extend in the axial direction A, the first direction X, and the second direction Y. In this case, the connection channel 1290A may be formed in a portion of the case 2A where the motor case portion 21 and the transmission mechanism case portion 22 or the output shaft case portion 23 are formed. The connection channel 1290A may be disposed above the first output member 61 as viewed in the axial direction in the area that overlaps the output gear 30 as viewed in the axial direction.

Although the embodiments are described in detail above, the present disclosure is not limited to the specific embodiments, and various modifications and changes can be made within the scope of the claims. It is also possible to combine all or part of the constituent elements of the embodiments described above. Of the effects of each embodiment, those related to dependent claims are additional effects distinct from generic concepts (independent claim).

For example, in the first embodiment described above, the first output member 61 is interposed between the rotating electrical machine 1 and the inverter device 90 in the first direction X at a position in the second direction Y where both the rotating electrical machine 1 and the inverter device 90 are disposed. However, the present disclosure is not limited to this. For example, the inverter device 90 may be disposed on the second side A2 in the axial direction with respect to the first output member 61. In this case, the differential case portion 50 may be interposed between the rotating electrical machine 1 or the speed reduction mechanism 34 and the inverter device 90 in the first direction X at a position in the second direction Y where both the rotating electrical machine 1 or the speed reduction mechanism 34 and the inverter device 90 are disposed. Even in such a case, the first output member 61 may be located between the rotating electrical machine 1 and the inverter device 90 in the first direction X at a position in the second direction Y where both the rotating electrical machine 1 and the inverter device 90 are disposed, as viewed in the axial direction.

In the first embodiment described above (and also the second embodiment), the inverter case portion 24 extends around the differential case portion 50 and the first output member 61 in the axial direction A (so as to face the differential case portion 50 and the first output member 61 in the first direction X and the second direction Y). However, the present disclosure is not limited to this. For example, in the first embodiment described above, the inverter case portion 24 may extend around the differential case portion 50, out of the differential case portion 50 and the first output member 61, in the axial direction A (so as to face the differential case portion 50 in the first direction X and the second direction Y). In the second embodiment described above, the inverter case portion 24A may extend around the differential case portion 50, out of the differential case portion 50 and the first output member 61, in the axial direction A (so as to face the differential case portion 50 in the second direction Y).

DESCRIPTION OF THE REFERENCE NUMERALS

1 . . . rotating electrical machine, 3 . . . transmission mechanism, 5 . . . differential gear mechanism, 51 . . . first side gear (side gear), 15 . . . rotor shaft, 2, 2A . . . case, 6 . . . output member, 61 . . . first output member, 30 . . . output gear, 90, 90A . . . inverter device, 99, 99A . . . inverter coolant channel (second coolant channel), 991, 991A . . . inlet portion, 129, 129A . . . motor coolant channel (first coolant channel), 1290, 1290A . . . connection channel. C1 . . . first axis (axis). C2 . . . second axis (axis), BA . . . battery. A . . . axial direction, X . . . first direction. Y . . . second direction. W/P . . . water pump

The invention claimed is:

1. A vehicle drive device, comprising:

a rotating electrical machine;

a first output member that is one of a pair of output members drivingly connected to a pair of wheels;

a transmission mechanism configured to transmit a driving force between the rotating electrical machine and the pair of output members;

an inverter device configured to receive power supply from a battery and supply power to the rotating electrical machine; and a case that houses the rotating electrical machine, the transmission mechanism, and the inverter device, wherein the rotating electrical machine and the pair of output members are disposed separately on two parallel axes;

the transmission mechanism includes, coaxially with the pair of output members, an output gear drivingly connected to at least one of the pair of output members;

the output gear overlaps each of the rotating electrical machine and the inverter device as viewed in an axial direction along an axial direction;

the inverter device overlaps the transmission mechanism or the first output member as viewed along an up-down direction;

a first coolant channel through which a coolant for cooling the rotating electrical machine passes and a second coolant channel through which a coolant for cooling the inverter device passes communicate with each other;

the second coolant channel includes an inlet portion into which the coolant discharged from a water pump is introduced;

the coolant from the second coolant channel is introduced into the first coolant channel, and the first coolant channel includes an outlet portion for returning the coolant to the water pump;

the inlet portion and the outlet portion overlap the output gear as viewed in the axial direction;

the first output member is interposed between the rotating electrical machine and the inverter device in a vehicle front-rear direction at a position in the up-down direction where both the rotating electrical machine and the inverter device are disposed; and the second coolant channel extends from below to above a central axis of the first output member in the up-down direction.

2. The vehicle drive device according to claim 1, wherein:

the inverter device includes a power module and a capacitor;

the second coolant channel includes a power module cooling portion that cools the power module via a fin provided on the power module, and a capacitor cooling portion that cools the capacitor via the case;

the power module cooling portion and the capacitor cooling portion overlap the output gear as viewed in the axial direction, and the coolant flows from the power module cooling portion into the first coolant channel via the capacitor cooling portion.

3. The vehicle drive device according to claim 1, wherein at least part of the second coolant channel overlaps the output gear as viewed in the axial direction.

4. The vehicle drive device according to claim 3, wherein:

the inverter device includes a power module and a capacitor, the second coolant channel includes a power module cooling portion that cools the power module, and a capacitor cooling portion that cools the capacitor; and the power module cooling portion and the capacitor cooling portion overlap the output gear as viewed in the axial direction.

5. The vehicle drive device according to claim 3, wherein the second coolant channel is disposed between the inverter device and the first output member in a vehicle front-rear direction or the up-down direction as viewed in the axial direction.

6. The vehicle drive device according to claim 1, wherein a sectional area of the second coolant channel taken along a plane including both a vehicle front-rear direction and the axial direction is larger at a position adjacent to the inlet portion than at a position overlapping the central axis of the first output member as viewed in a direction along the vehicle front-rear direction out of positions along the up-down direction.

7. The vehicle drive device according to claim 1, further comprising:

a connection channel connecting the first coolant channel and the second coolant channel in the case; wherein the connection channel overlaps the output gear as viewed in the axial direction and extends in the axial direction and a vehicle front-rear direction.

8. A vehicle drive device, comprising:

a rotating electrical machine;

a first output member that is one of a pair of output members drivingly connected to a pair of wheels;

a transmission mechanism configured to transmit a driving force between the rotating electrical machine and the pair of output members;

an inverter device configured to receive power supply from a battery and supply power to the rotating electrical machine; and a case that houses the rotating electrical machine, the transmission mechanism, and the inverter device, wherein the rotating electrical machine and the pair of output members are disposed separately on two parallel axes;

the transmission mechanism includes, coaxially with the pair of output members, an output gear drivingly connected to at least one of the pair of output members;

the output gear overlaps each of the rotating electrical machine and the inverter device as viewed in an axial direction along an axial direction;

the inverter device overlaps the transmission mechanism or the first output member as viewed along an up-down direction;

a first coolant channel through which a coolant for cooling the rotating electrical machine passes and a second coolant channel through which a coolant for cooling the inverter device passes communicate with each other;

the inverter device includes a power module and a capacitor;

the second coolant channel includes a power module cooling portion that cools the power module via a fin on the power module, and a capacitor cooling portion that cools the capacitor via the case;

the power module cooling portion and the capacitor cooling portion overlap the output gear as viewed in the axial direction; and the coolant flows from the power module cooling portion into the first coolant channel via the capacitor cooling portion.

* * * * *